US012271120B2

(12) United States Patent
Kang et al.

(10) Patent No.: US 12,271,120 B2
(45) Date of Patent: Apr. 8, 2025

(54) TONER REFILL CARTRIDGE HAVING PUMP FOR AUTOMATIC TONER REFILLING

(71) Applicant: Hewlett-Packard Development Company, L.P., Spring, TX (US)

(72) Inventors: Shinhyup Kang, Seongnam Si (KR); Yongnam Ahn, Seongnam Si (KR); Jinhwa Hong, Seongnam Si (KR); Junhui Kim, Seongnam Si (KR)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 18/292,334

(22) PCT Filed: Jan. 5, 2022

(86) PCT No.: PCT/US2022/070029

§ 371 (c)(1),
(2) Date: Jan. 25, 2024

(87) PCT Pub. No.: WO2023/019032

PCT Pub. Date: Feb. 16, 2023

(65) Prior Publication Data

US 2024/0345507 A1 Oct. 17, 2024

(30) Foreign Application Priority Data

Aug. 11, 2021 (KR) ........................ 10-2021-0106233

(51) Int. Cl.
*G03G 15/08* (2006.01)

(52) U.S. Cl.
CPC ................................ *G03G 15/0868* (2013.01)

(58) Field of Classification Search
CPC ........... G03G 15/0822; G03G 15/0865; G03G 15/0867; G03G 15/0868; G03G 15/0874
See application file for complete search history.

(56) References Cited

U.S. PATENT DOCUMENTS 8,050,597 B2 * 11/2011 Yoshizawa ......... G03G 15/0879 399/261
8,755,720 B2 * 6/2014 Mitani ............... G03G 15/0877 399/258

(Continued)

FOREIGN PATENT DOCUMENTS

EP 3588196 B1 5/2021
JP 3400631 B2 4/2003
JP 2006-084755 A 3/2006

*Primary Examiner* — Hoang X Ngo
(74) *Attorney, Agent, or Firm* — Foley & Lardner LLP

(57) ABSTRACT

A toner refill cartridge includes a housing having an opening; a toner storage portion arranged inside the housing and to store a toner; a toner discharge portion at an end of the toner storage portion and to discharge the toner; a pump including a variable volume member capable of retracting and expanding, the pump to provide pressure, through a volume change of the variable volume member, for discharging the toner; a driving force input portion rotatable by a driving force received from outside; and a driving force transmission portion to receive a rotational force of the driving force input portion, convert the rotational force into driving force for changing a volume of the variable volume member, and transmit the driving force to the pump.

15 Claims, 26 Drawing Sheets

(56) References Cited

U.S. PATENT DOCUMENTS

| | | | | |
|---|---|---|---|---|
| 2001/0052526 | A1 * | 12/2001 | Kasahara | G03G 15/0865 222/105 |
| 2009/0022531 | A1 | 1/2009 | Kubota et al. | |
| 2019/0339634 | A1 | 11/2019 | Okino et al. | |
| 2020/0081372 | A1 | 3/2020 | Kinoshita | |
| 2021/0080868 | A1 | 3/2021 | Yamada et al. | |

* cited by examiner

TONER REFILL CARTRIDGE HAVING PUMP FOR AUTOMATIC TONER REFILLING

CROSS-REFERENCE TO RELATED APPLICATIONS

This application is a U.S. National Stage Patent Application under 35 U.S.C. § 371 of PCT/US2022/070029, filed Jan. 5, 2022, which claims priority to Korean Patent Application No. 10-2021-0106233, filed Aug. 11, 2021, which are hereby incorporated by reference in their entireties.

BACKGROUND

An image forming apparatus using an electrophotographic method is a printer that supplies toner to an electrostatic latent image formed on a photoreceptor to form a visible toner image on the photoreceptor, transfers the toner image to a print medium via an intermediate transfer medium or directly to a print medium, and then fixes the transferred toner image on the print medium.

A developing cartridge stores a toner and supplies the toner to an electrostatic latent image formed on the photoreceptor to form a visible toner image. When the toner in the developing cartridge is exhausted, the developing cartridge is removed from a main body of the image forming apparatus, and a new developing cartridge may be mounted on the main body of the image forming apparatus. New toner may be refilled in the developing cartridge by using a toner refill kit (or a toner refill cartridge).

DETAILED DESCRIPTION

Figure 1:
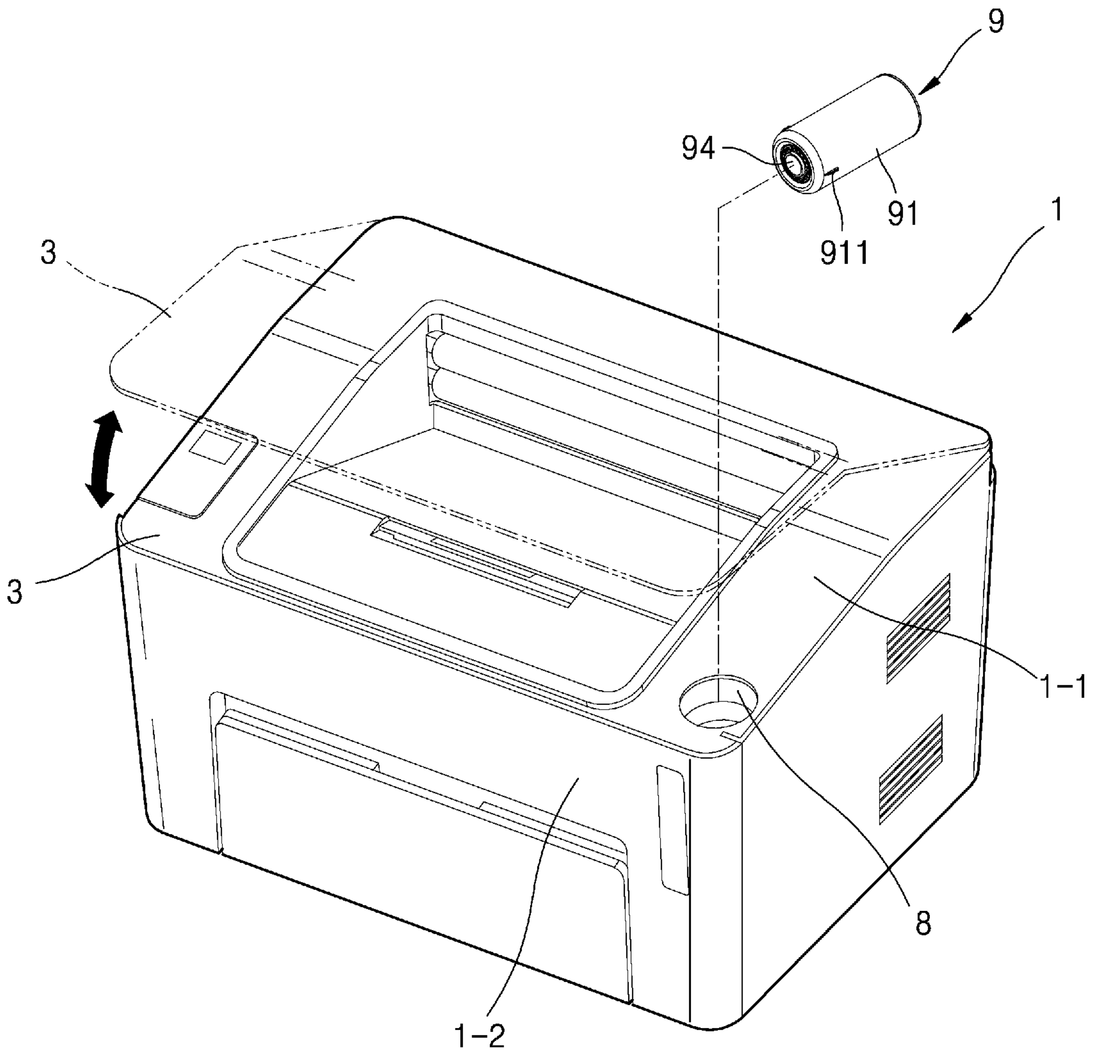
FIG. 1 is an external perspective view of an example of an electrophotographic image forming apparatus.

Toner refill cartridges may include a toner refill cartridge in which a user directly pressurizes a toner to manually discharge the toner, or a toner refill cartridge in which a toner is automatically discharged by receiving a driving force from a main body of an image forming apparatus.

The manually discharged toner refill cartridge discharges a toner based a user applying a physical force, which may be inconvenient to the user. The toner refill cartridge that automatically discharges a toner is not based on a user applying a physical force, so that user convenience may be improved.

A toner refill cartridge according to the some examples automatically discharges a toner by receiving a driving force from a main body, and includes a pump that adjusts an internal pressure of a toner storage portion that stores the toner in order to stably supply the toner. The pump provides a pressure for discharging the toner through a change in volume of a variable volume member.

The variable volume member is a member capable of retracting and expanding, and is arranged such that a retracting direction thereof is the same as a toner discharge direction of a toner discharge portion. Because of this, by matching a pressing direction of the toner by the pump and the toner discharge direction of the toner discharge portion, a pressing force by the pump may be transmitted to the toner without loss.

In addition, the variable volume member is arranged on the opposite side of the toner discharge portion with the toner storage portion therebetween. By arranging the variable volume member and the toner discharge portion opposite to each other with the toner storage portion therebetween, it is possible to prevent the toner from sticking between pleats of the variable volume member while the toner is discharged through the toner discharge portion.

Thus, the retraction and expansion of the variable volume member may be constantly progressed.

In addition, in the toner refill cartridge according to the some examples, a driving force input portion receiving a driving force and the toner discharge portion discharging the toner are arranged adjacent to one end of a housing. Accordingly, a configuration of the main body to which the toner refill cartridge is connected may be simplified.

Hereinafter, examples of the toner refill cartridge and an image forming apparatus equipped with the toner refill cartridge will be described in detail with reference to the accompanying drawings. The same reference numerals are used to denote the same elements, and repeated descriptions thereof will not be given herein.

Figure 2:
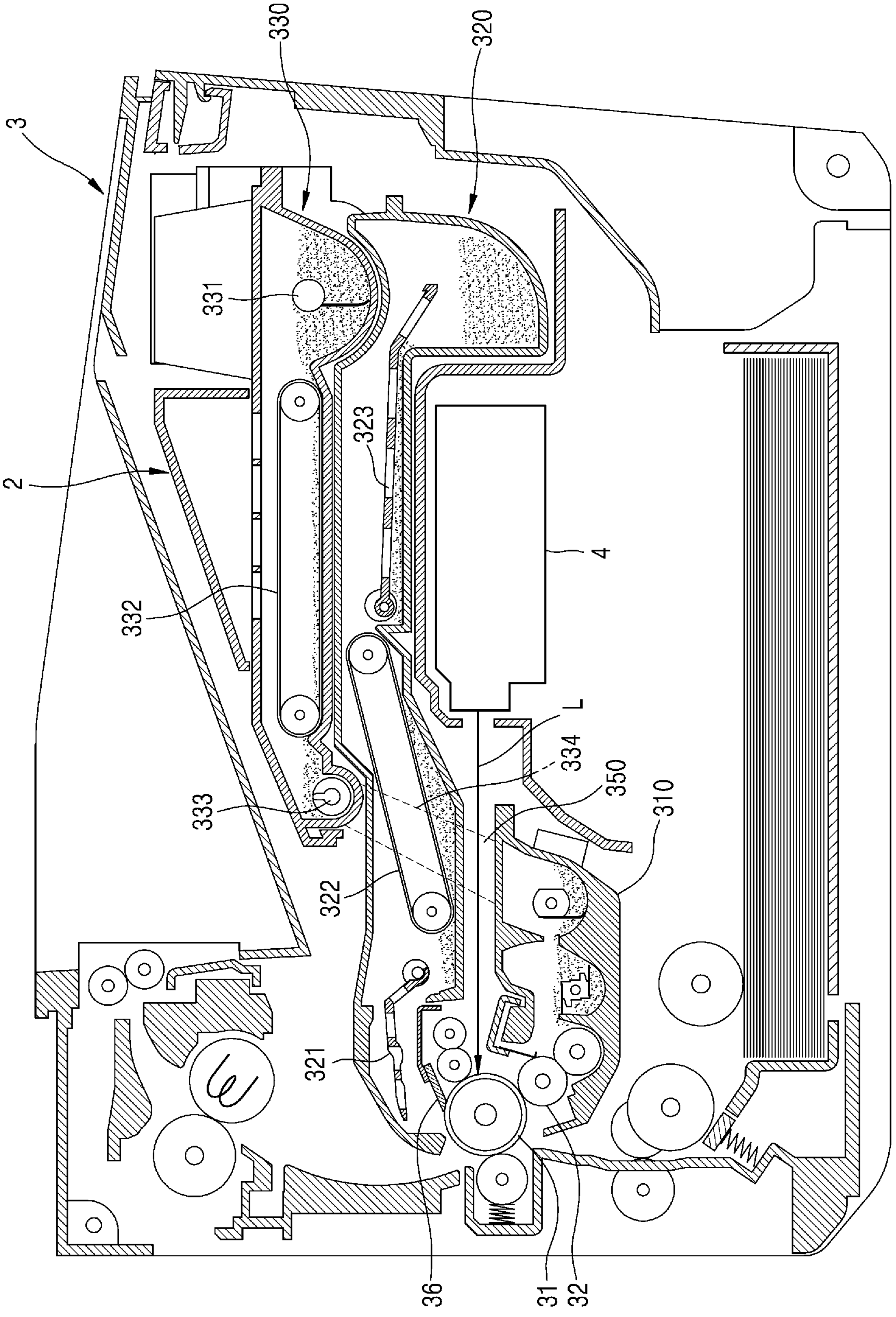
FIG. 2 is a configuration diagram of an example of the electrophotographic image forming apparatus shown in FIG. 1.
Figure 3:
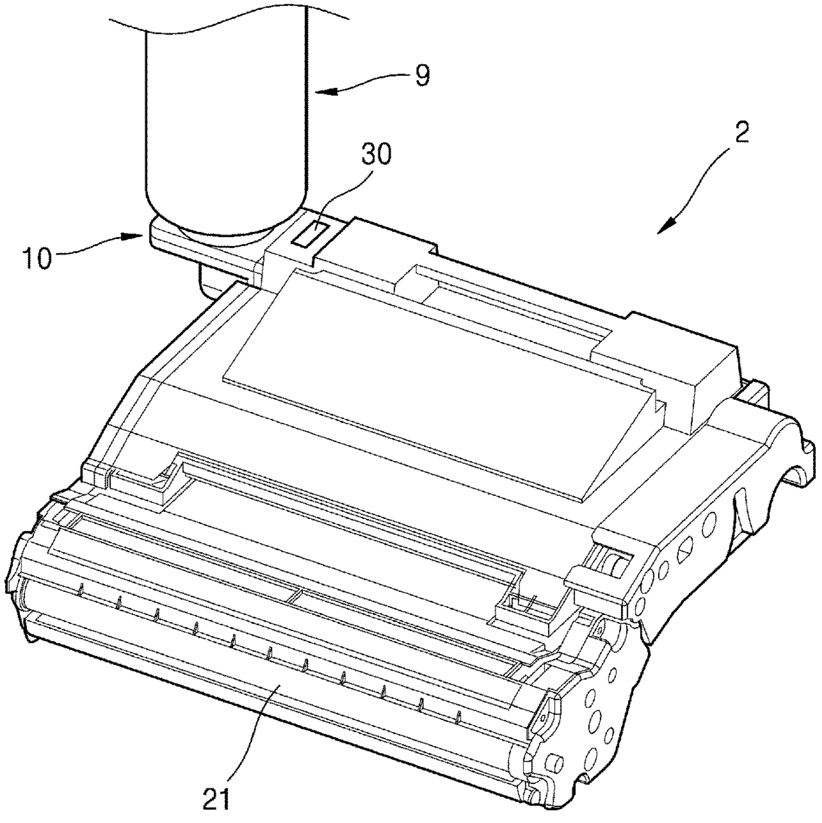
FIG. 3 is a perspective view of an example of a developing cartridge employed in an example of the electrophotographic image forming apparatus shown in FIG. 1.

FIG. 1 is an external perspective view of an example of an electrophotographic image forming apparatus. FIG. 2 is a configuration diagram of an example of the electrophotographic image forming apparatus shown in FIG. 1; FIG. 3 is a perspective view of an example of a developing cartridge employed in an example of the electrophotographic image forming apparatus shown in FIG. 1. Referring to FIGS. 1 to 3, the image forming apparatus may include a main body 1 and a developing cartridge 2 in the form of a cartridge removable from a main body 1. The main body 1 may include a door 3. FIG. 1 shows the door 3 for opening an upper portion of the main body 1, but a door for opening a side or the whole of the main body 1 may be employed if necessary. A user may open the door 3 and mount or remove the developing cartridge 2 onto or from the main body 1.

The developing cartridge 2 according to some examples includes a developing portion 310 provided with a photosensitive drum 31 and a developing roller 32, a waste toner accommodating portion 320 in which waste toner removed from the photosensitive drum 31 is stored, and a toner accommodating portion 330 connected to the developing portion 310 and storing a toner. A toner refill portion 10 provides an interface between a toner refill cartridge 9 and the developing cartridge 2, which will be described later, in order to refill the toner accommodating portion 330 with a toner.

The waste toner accommodating portion 320 is above the developing portion 310. An optical path 350 is formed between the waste toner accommodating portion 320 and the developing portion 310. Waste toner removed from the photosensitive drum 21 by a cleaning member 36 is accommodated in the waste toner refill portion 320. The waste toner is transferred into the waste toner accommodating portion 320 by one or more waste toner transfer members 321, 322, and 323.

The toner accommodating portion 330 is connected to the toner refill portion 10. The toner accommodating portion 330 is connected to the developing portion 310 by a toner supply 334 as shown by dashed lines in FIG. 2. The toner supply 334 may be located outside an effective width of exposure light L so as not to interfere with the exposure light L scanned in a main scanning direction by an optical scanner 4. The toner accommodating portion 330 may include one or more toner supply members 331, 332, and 333 for supplying a toner to the developing portion 310 through the toner supply 334. The toner supply member 333 may transport the toner in the main scanning direction and to the toner supply 334.

The developing cartridge 2 supplies the toner in the toner accommodating portion 330 to an electrostatic latent image formed on the photosensitive drum 31 to form a visible toner image. The developing cartridge 2 is removable from the main body 1. In an image forming apparatus of some examples, the toner may be refilled in the developing cartridge 2 while the developing cartridge 2 mounted on the main body 1, without removing the developing cartridge 2 from the main body 1.

Referring to FIGS. 1 and 3, the toner refill cartridge 9 contains a toner and discharges the toner through a toner discharge portion 94. Although not shown, the toner refill cartridge 9 may include a communication unit for communicating with the main body 1. The communication unit is electrically connected to the main body 1 when the toner refill cartridge 9 is mounted on the toner refill portion 10. The communication unit may perform functions such as indicating whether the toner refill cartridge 9 is mounted on the toner refill portion 10, and performing information transfer of the toner refill cartridge 9. The communication unit may include a so-called customer replaceable unit monitor (CRUM).

The main body 1 is provided with a communicating portion 8 so that the developing cartridge 2 can access, from outside of the main body 1, the toner refill portion 10, while the developing cartridge 2 is mounted on the main body 1. For example, the communicating portion 8 may be provided on an upper surface 1-1 of the main body 1 at a position close to a front portion 1-2 of the main body 1. The toner refill portion 10 is below the communicating portion 8. When the toner refill cartridge 9 is inserted into the communicating portion 8 from above the main body 1, the toner refill cartridge 9 may be connected to the toner refill portion 10 as shown in FIG. 3. In this state, the toner in the toner refill cartridge 9 may be discharged through the toner discharge portion 94 and supplied to the toner accommodating portion 330 of the developing cartridge 2 through the toner refill portion 10. The toner refill cartridge 9 is removed from the communicating portion 8 after toner refilling is complete.

Figure 4:
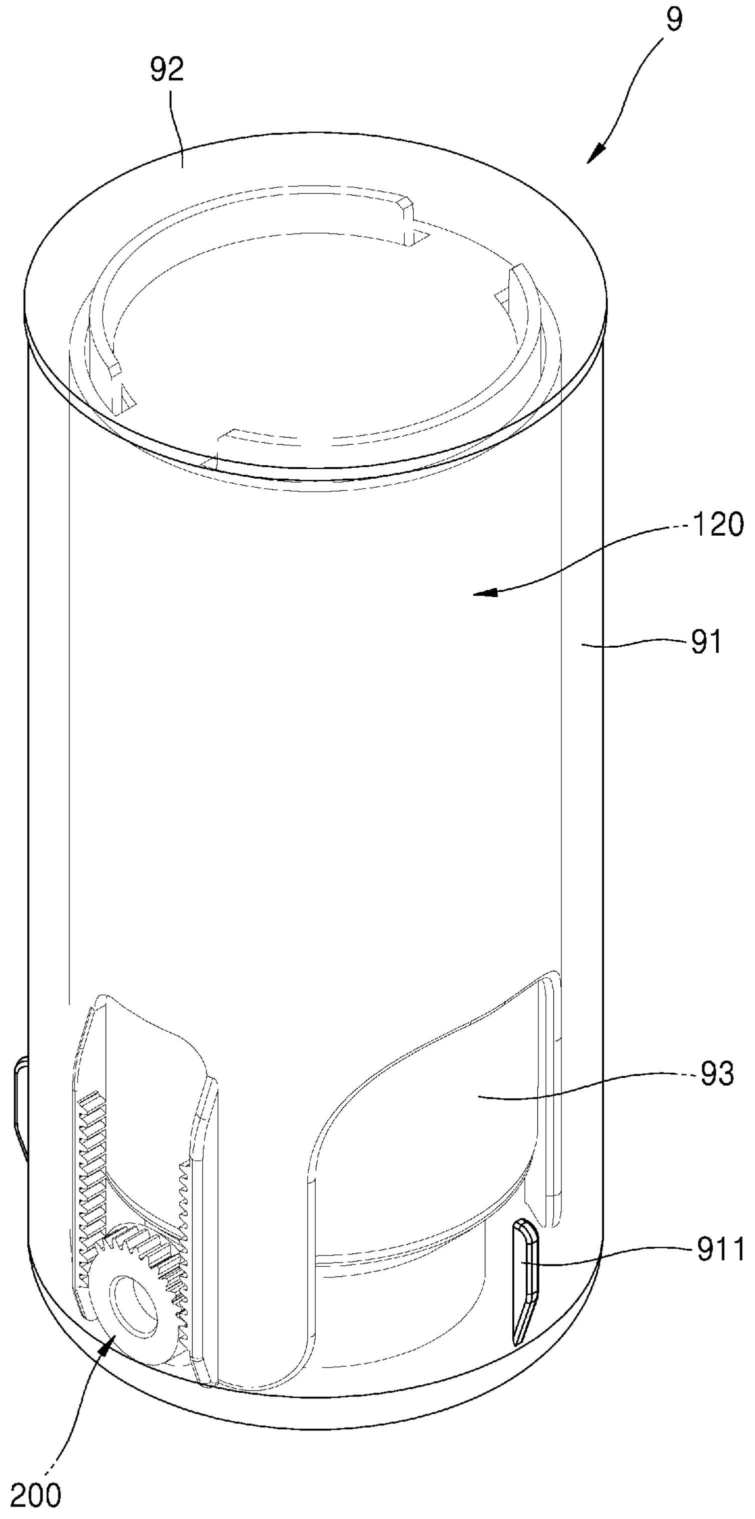
FIG. 4 is an assembled perspective view of an example of a toner refill cartridge.
Figure 5:
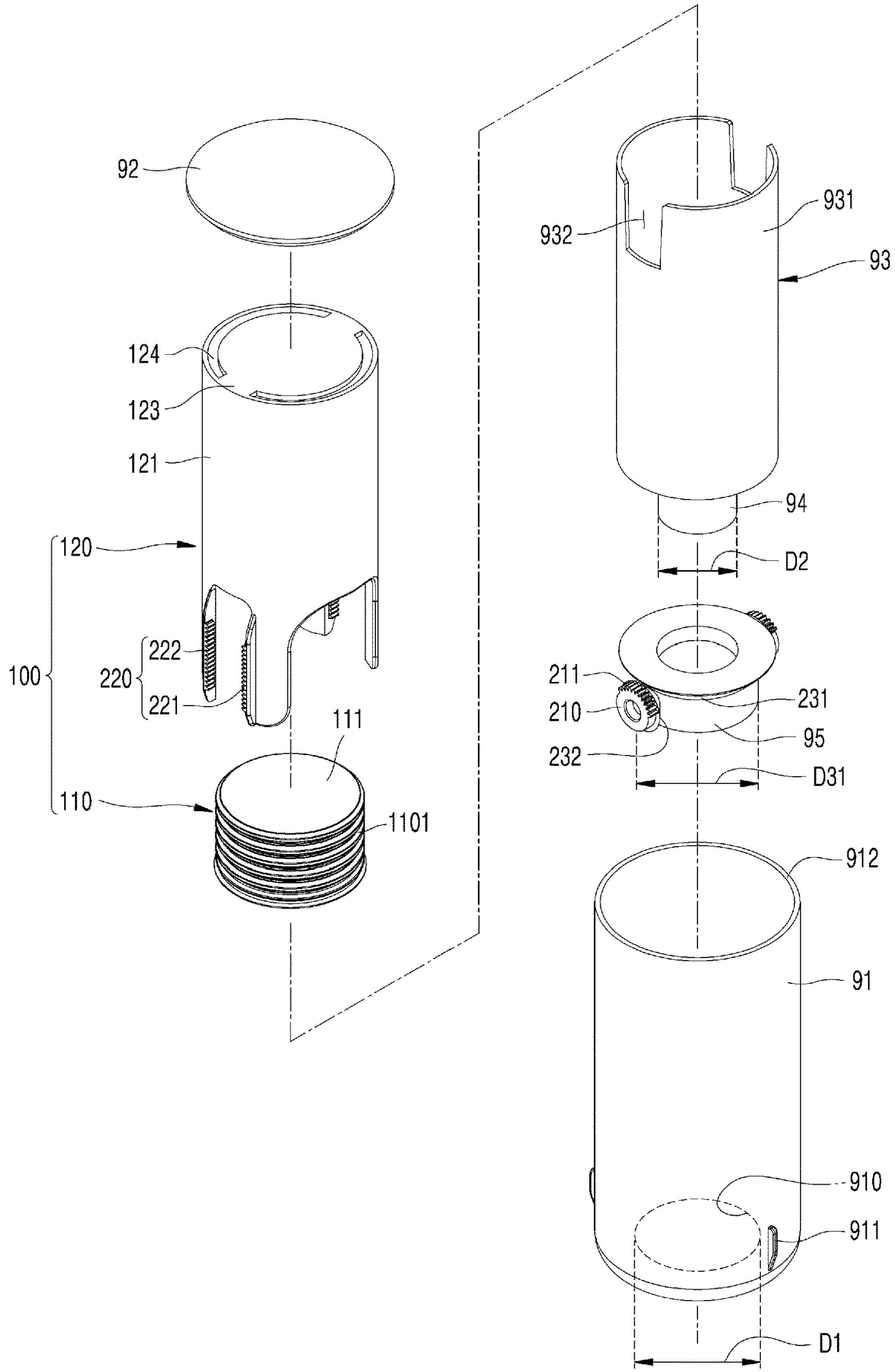
FIG. 5 is an exploded perspective view of an example of a toner refill cartridge.
Figure 6:
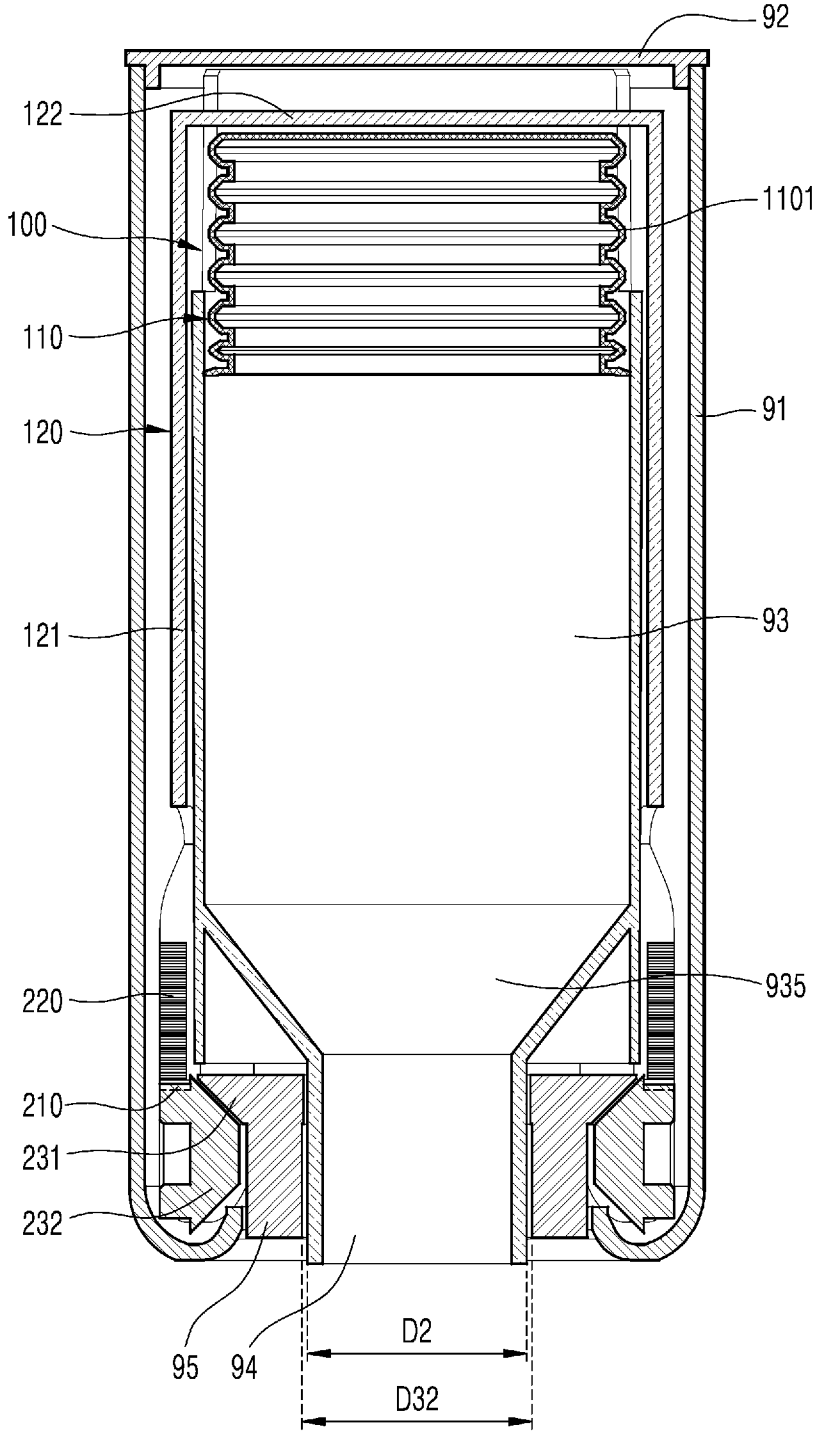
FIG. 6 is a cross-sectional view of the toner refill cartridge of FIG. 4.

FIG. 4 is an assembled perspective view of an example of the toner refill cartridge, and FIG. 5 is an exploded perspective view of an example of the toner refill cartridge 9. FIG. 6 is a cross-sectional view of the toner refill cartridge 9 of FIG. 4.

Referring to FIGS. 4 to 6, the toner refill cartridge 9 includes a housing 91, a toner storage portion 93, a toner discharge portion 94 connected to the toner storage portion 93, a pump 100, a driving force input portion 95, and a driving force transmission portion 200.

The housing 91 forms the exterior of the toner refill cartridge 9. The toner storage portion 93, the toner discharge portion 94, the pump 100, the driving force input portion 95, and the driving force transmission portion 200 are arranged inside the housing 91. A lid 92 is coupled to one end 912 of the housing 91. An opening 910 for exposing the toner discharge portion 94 and the driving force input portion 95 is provided at the other end of the housing 91. A diameter D1 of the opening 910 may be greater than an outer diameter D2 of the toner discharge portion 94. The diameter D1 of the opening 910 may be greater than an outer diameter D31 of the driving force input portion 95.

An anti-rotation protrusion 911 is provided on an outer peripheral surface of the housing 91. The anti-rotation protrusion 911 prevents the toner refill cartridge 9 from rotating in the communicating portion 8 when the toner refill cartridge 9 is inserted into the communicating portion 8 (see FIG. 1).

The toner storage portion 93 is for storing a toner in the housing 91 and may have a cylindrical structure. The toner storage portion 93 is fixed to the housing 91. The toner discharge portion 94 from which the toner is discharged is provided at one end of the toner storage portion 93.

The toner discharge portion 94 may have a cylindrical shape and protrudes from one end of the toner storage portion 93. An inner diameter of the toner discharge portion 94 may be less than an inner diameter of the toner storage portion 93. A nozzle area 935 is provided between the toner discharge portion 94 and the toner storage portion 93. The nozzle area 935 has an inner diameter that is tapered towards the the toner discharge portion 94, i.e., the inner diameter of the nozzle area 935 nearer the toner discharge portion 94 is less than the inner diameter of the nozzle area 935 farther away from the toner discharge portion 94.

The driving force input portion 95 may be exposed to the outside of the toner refill cartridge 9 through the opening 910 of the housing 91. The driving force input portion 95 is rotated by receiving a driving force from outside. For example, the driving force input portion 95 may be a coupler that rotates by receiving a rotational force from outside. For example, when the toner refill cartridge 9 is mounted to the toner refill portion 10 through a communicating portion 8, a driving coupler (not shown) provided in the toner refill portion 10 is connected to the driving force input portion 95 through the opening 910. The driving force input portion 95 is rotated by receiving a rotational force from the driving coupler.

The driving force input portion 95 is arranged adjacent to the toner discharge portion 94. For example, the driving force input portion 95 is arranged to surround the toner discharge portion 94. The driving force input portion 95 may have a ring structure. The toner discharge portion 94 has a fixed position with respect to the housing 91, while the driving force input portion 95 is rotatable inside the housing 91. The driving force input portion 95 is rotatable with respect to the toner discharge portion 94. An inner diameter D32 of the driving force input portion 95 is greater than the outer diameter D2 of the toner discharge portion 94. A gap exists between the driving force input portion 95 and the toner discharge portion 94 in a direction perpendicular to a toner discharge direction (the direction in which the toner is discharged through the toner discharge portion 94, shown as Z2 in FIG. 7).

A rotation center of the driving force input portion 95 may be arranged inside the toner discharge portion 94. For example, the rotation center of the driving force input portion 95 may be arranged to coincide with the center of the toner discharge portion 94. The driving force input portion 95 and the toner discharge portion 94 are arranged inside the other end of the housing 91.

The toner stored in the toner storage portion 93 may have low fluidity. In this state, even if the toner discharge portion 94 is opened, the toner stored in the toner storage portion 93 may not be easily discharged to the toner discharge portion 94. The toner refill cartridge 9 of the present example may include the pump 100 providing pressure for discharging the toner inside the toner storage portion 93 so that the toner is stably discharged through the toner discharge portion 94.

The pump 100 may include a variable volume member 110 that can be retracted and expanded, and a pressing member 120 that presses the variable volume member 110. The pump 100 may provide pressure, through a volume change of the variable volume member 110, for discharging the toner to the toner storage portion 93 by adjusting an internal pressure of the toner storage portion 93.

The variable volume member 110 may have a bellows structure that is folded in a toner discharge direction (Z2 in FIG. 7) or unfolded in the opposite direction to the toner discharge direction. The variable volume member 110 may have a plurality of pleats 1101. A lower area of the variable volume member 110 may be fixed to the toner storage portion 93. When the variable volume member 110 is folded and retracted, air inside the variable volume member 110 moves to the toner storage portion 93, and the internal pressure of the toner storage portion 93 may increase. The internal pressure of the toner storage portion 93 may be greater than atmospheric pressure. The internal pressure of the toner storage portion 93 may be greater than an internal pressure of the toner accommodating portion 330 (see FIG. 2) of the developing cartridge 2 (see FIG. 2). Due to a pressure difference between the toner storage portion 93 and the toner accommodating portion 330, the toner stored in the toner storage portion 93 may be supplied to the toner accommodating portion 330 through the toner discharge portion 94.

At least a portion of the variable volume member 110 may be arranged inside the toner storage portion 93. For example, when the variable volume member 110 is expanded, the entirety of the variable volume member 110 may be arranged inside the toner storage portion 93. Through this, an increase in the volume of the toner refill cartridge 9 may be prevented by the variable volume member 110.

Figure 7:
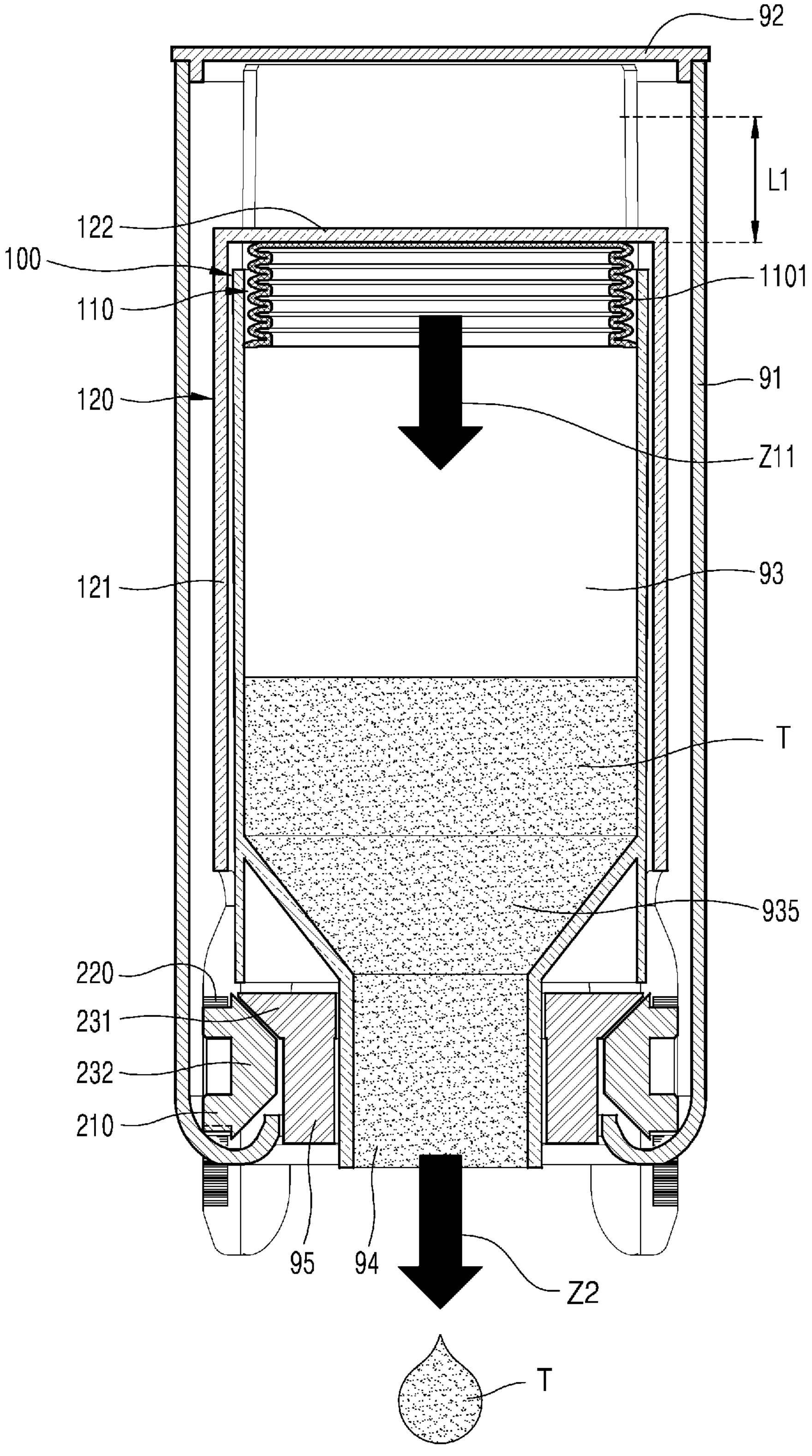
FIG. 7 is a cross-sectional view illustrating when a variable volume member is retracted in a toner refill cartridge, according to an example.
Figure 8:
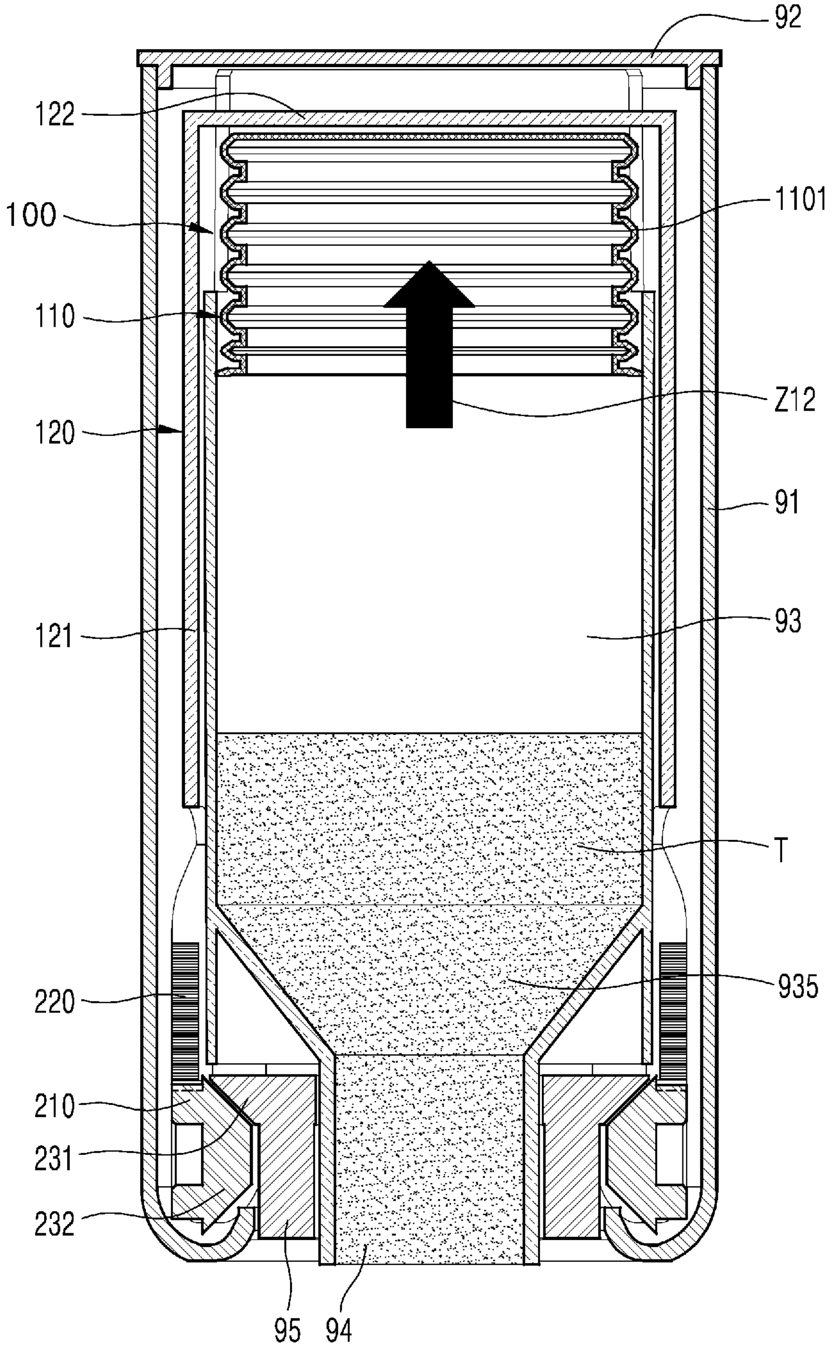
FIG. 8 is a cross-sectional view illustrating when a variable volume member is expanded in a toner refill cartridge, according to an example.

FIGS. 7 and 8 are cross-sectional views illustrating when the variable volume member 110 is retracted and expanded, respectively, in the toner refill cartridge 9 according to an example. Referring to FIGS. 7 and 8, while a lower area of the variable volume member 110 is fixedly supported by the toner storage portion 93, the variable volume member 110 may be fully retracted by moving down its upper area, or may be fully expanded by moving up its upper area.

When the variable volume member 110 is retracted (FIG. 7), the air inside the toner storage portion 93 is compressed to increase the internal pressure. Accordingly, a toner T stored in the toner storage portion 93 is discharged through the toner discharge portion 94. Because a length L1 at which the variable volume member 110 is retracted is determined, the internal pressure of the toner storage portion 93 compressed by the pump 100 is set to certain pressure. On the other hand, an internal pressure of the developing cartridge 2 may be maintained at the same state as atmospheric pressure. For example, as shown in FIG. 3, the internal pressure of the developing cartridge 2 may be maintained at atmospheric pressure by a filter 30 for selectively passing air. The filter 30 blocks the outflow of the toner T and selectively passes air, and may include an air valve or a sealing member. Accordingly, when the variable volume member 110 is retracted, the internal pressure of the toner storage portion 93 pressurized by the pump 100 has a constant difference from the internal pressure of the developing cartridge 2, so that toner is discharged by a certain amount through the toner discharge portion 94.

After a certain amount of the toner T is discharged through the toner discharge portion 94, as shown in FIG. 8, the variable volume member 110 is expanded in a direction Z12 opposite to a retraction direction Z11 and restored to an expanded state before being retracted. Thereafter, the variable volume member 110 alternately retracts and expands, and in this process, the toner T is repeatedly discharged by a certain amount.

The variable volume member 110 is arranged at the other end of the toner storage portion 93 (from the toner discharge portion 94) and communicates with the toner storage portion 93. The variable volume member 110 is arranged farthest from the toner discharge portion 94 with the toner storage portion 93 therebetween.

When the variable volume member 110 and the toner discharge portion 94 are arranged close to each other at one end of the toner storage portion 93, the toner T may stick between the pleats 1101 of the variable volume member 110. As a result, the expansion and retraction motion of the variable volume member 110 may not proceed smoothly, and the toner T may remain between the pleats 1101 and may not be discharged to the toner discharge portion 94.

On the other hand, in the toner refill cartridge 9 according to an example, as the variable volume member 110 and the toner discharge portion 94 are arranged opposite to each other with the toner storage portion 93 therebetween, it is possible to prevent the toner T from sticking between the pleats 1101 of the variable volume member 110 while the toner T is discharged through the toner discharge portion 94. Thus, retraction and expansion of the variable volume member 110 may be smoothly performed.

Figure 9:
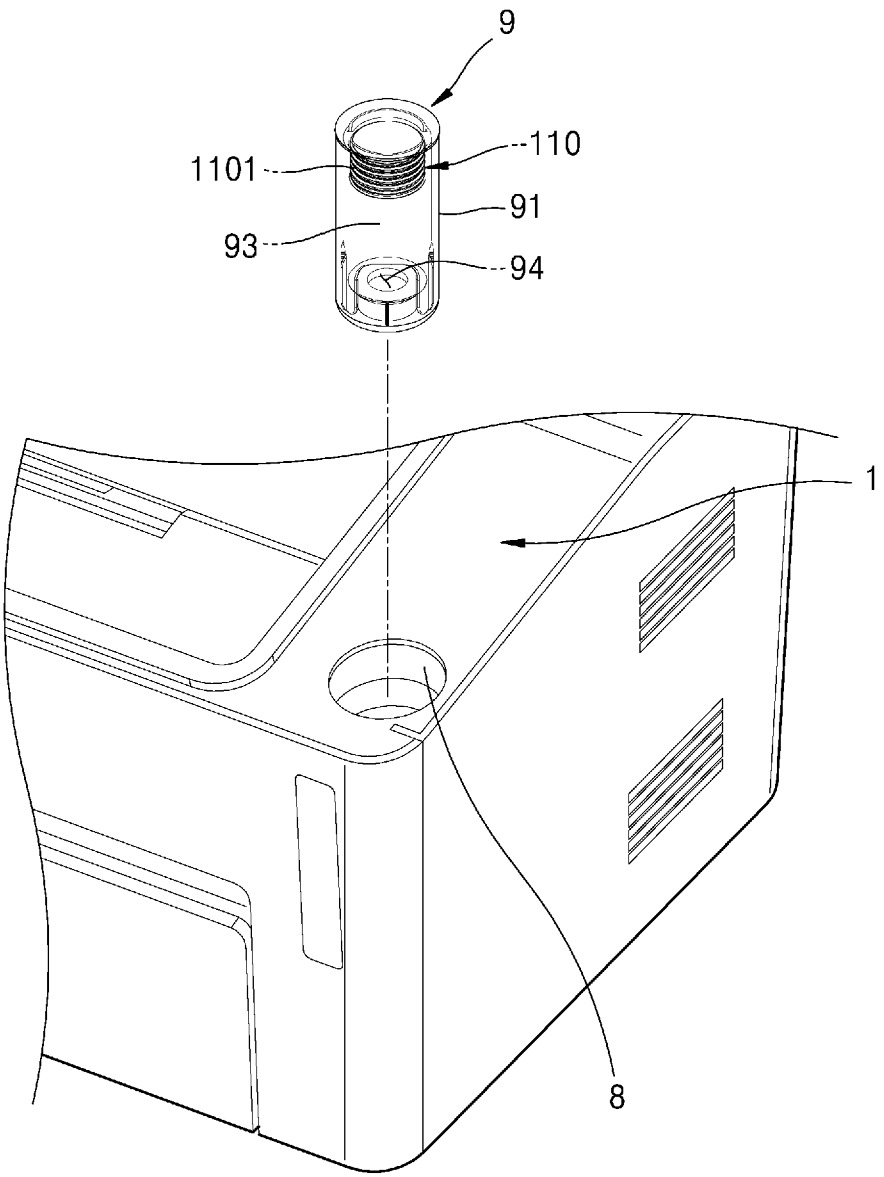
FIG. 9 is a view illustrating a state in which a toner refill cartridge according to an example is mounted on a main body.

FIG. 9 is a view illustrating a state in which the toner refill cartridge 9 according to an example is mounted on the main body 1. Referring to FIG. 9, when the toner refill cartridge 9 is mounted on the main body 1, the toner refill cartridge 9 is inserted into the communicating portion 8 in an upright posture in the gravity direction. When the toner refill cartridge 9 is inserted into the communicating portion 8, the toner discharging portion 94 is arranged in the gravity direction. The variable volume member 110 is above the toner storage portion 93. When the toner of the toner refill cartridge 9 is discharged, the toner stored in the toner storage portion 93 moves in the gravity direction through the toner discharge portion 94 at a position lower than the variable volume member 110. Accordingly, in the process of discharging the toner through the toner discharge portion 94, a phenomenon in which the toner sticks between the pleats 1101 of the variable volume member 110 hardly occurs, and retraction and expansion of the variable volume member 110 may proceed smoothly.

Referring back to FIG. 7, the retraction direction Z11 of the variable volume member 110 is the same as the toner discharge direction Z2 of the toner discharge portion 94. The retraction direction Z11 of the variable volume member 110 may be aligned with the toner discharge direction Z2 of the toner discharge portion 94. Accordingly, a pressing force applied to the toner T by the pump 100 may be the same as the toner discharge direction Z2. Through this, the pressing force by the pump 100 is transferred to the toner T without loss, so that the toner T may be efficiently discharged.

Figure 10:
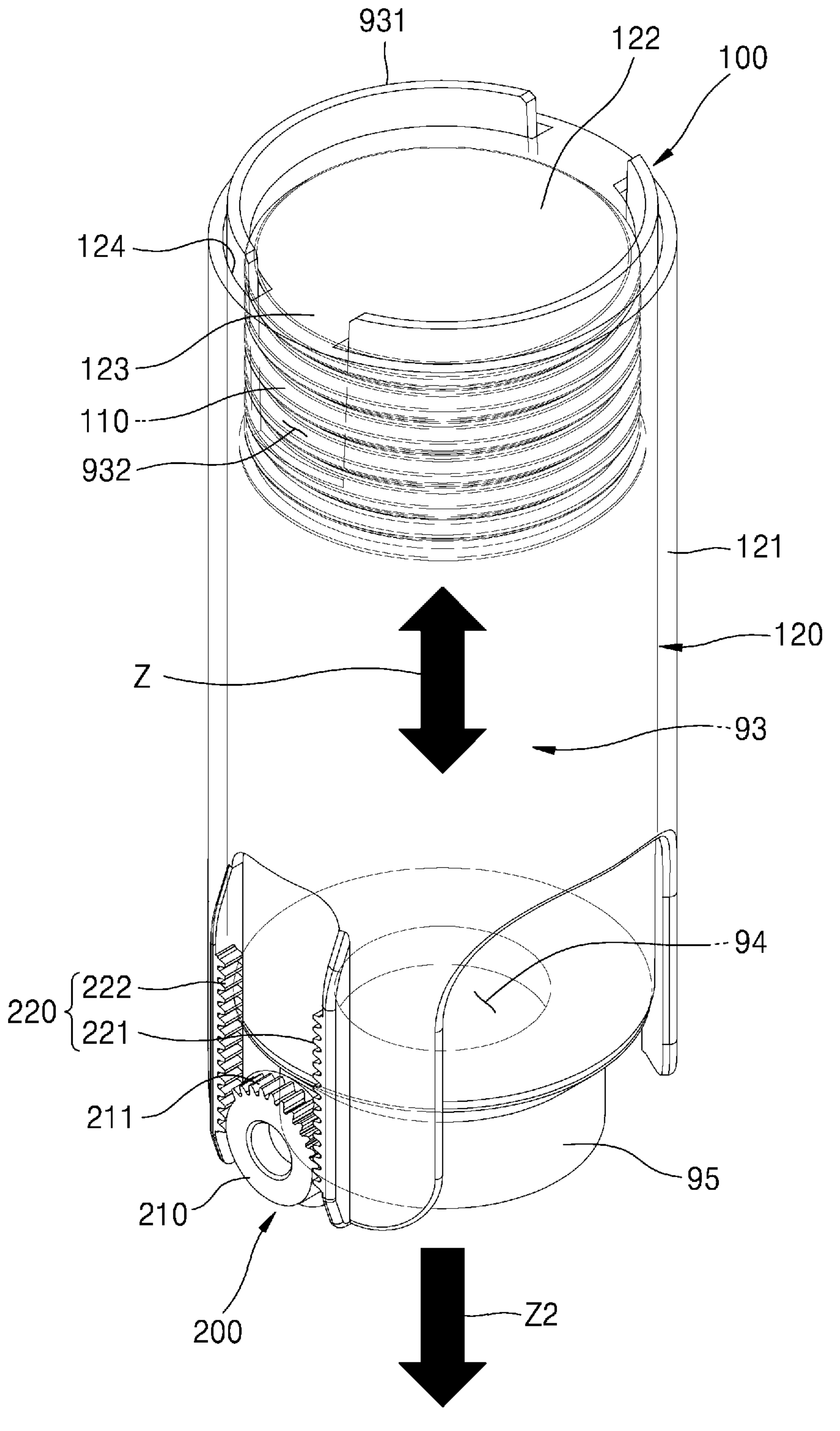
FIG. 10 is a view for explaining a pressing member of a toner refill cartridge according to an example.

FIG. 10 is a view for explaining the pressing member 120 of the toner refill cartridge 9 according to an example. In FIG. 10, the housing 91 and the lid 92 is omitted for convenience of description.

Referring to FIGS. 5 and 10, the pressing member 120 presses the variable volume member 110, and may reciprocate linearly in a direction parallel to the toner discharge direction of the toner discharge portion 94. The pressing member 120 includes a pressing plate 122 that presses an upper surface 111 of the variable volume member 110. The pressing member 120 also includes a pressing frame 121 that supports the pressing plate 122 and is arranged outside the toner storage portion 93. The pressing frame 121 may have a cylindrical structure surrounding the toner storage portion 93.

The shape of the pressing plate 122 may correspond to the shape of the upper surface 111 of the variable volume member 110. For example, if the upper surface 111 of the variable volume member 110 has a circular shape, the pressing plate 122 may also have a circular shape. However, the shape of the pressing plate 122 is not limited thereto, and may be variously modified as long as it has a structure for pressing the upper surface 111 of the variable volume member 110.

When the pressing member 120 descends, the pressing plate 122 may contact and press the upper surface 111 of the variable volume member 110 to retract the variable volume member 110.

The pressing frame 121 extends in a direction parallel to a toner discharge direction Z2 of the toner discharge portion 94. The pressing plate 122 may be supported by the pressing frame 121 by a plurality of connecting portions 123. A cutout 124 is partially arranged on an edge of the pressing plate 122. The toner storage portion 93 includes a protrusion 931 having a cross-sectional shape corresponding to the shape of the cutout 124 and a concave portion 932 arranged between the protrusion 931. The protrusion 931 and the concave portion 932 extend in a moving direction of the pressing member 120.

The pressing member 120 receives a driving force through the driving force transmission portion 200 and reciprocates in a direction Z parallel to the toner discharge direction Z2. When the pressing member 120 reciprocates, the protrusion 931 of the toner storage portion 93 passes through the cutout 124 of the pressing member 120, and a connecting portion 123 of the pressing member 120 moves along the concave portion 932 of the toner storage portion 93. Through this structure, the pressing plate 122 of the pressing member 120 may press the variable volume member 110 arranged inside the toner storage portion 93.

The driving force transmission portion 200 receives a rotational force of the driving force input portion 95, converts the rotational force into driving force for changing the volume of the variable volume member 110, and transmits the driving force to the pump 100. The driving force transmission portion 200 is arranged between the pump 100 and the driving force input portion 95, and transmits the rotational force of the driving force input portion 95 to the pressing member 120 to linearly reciprocate the pressing member 120 in the vertical direction Z. The driving force transmission portion 200 is configured to convert the rotational motion of the driving force input portion 95 into a reciprocating linear motion of the pressing member 120.

Figure 11:
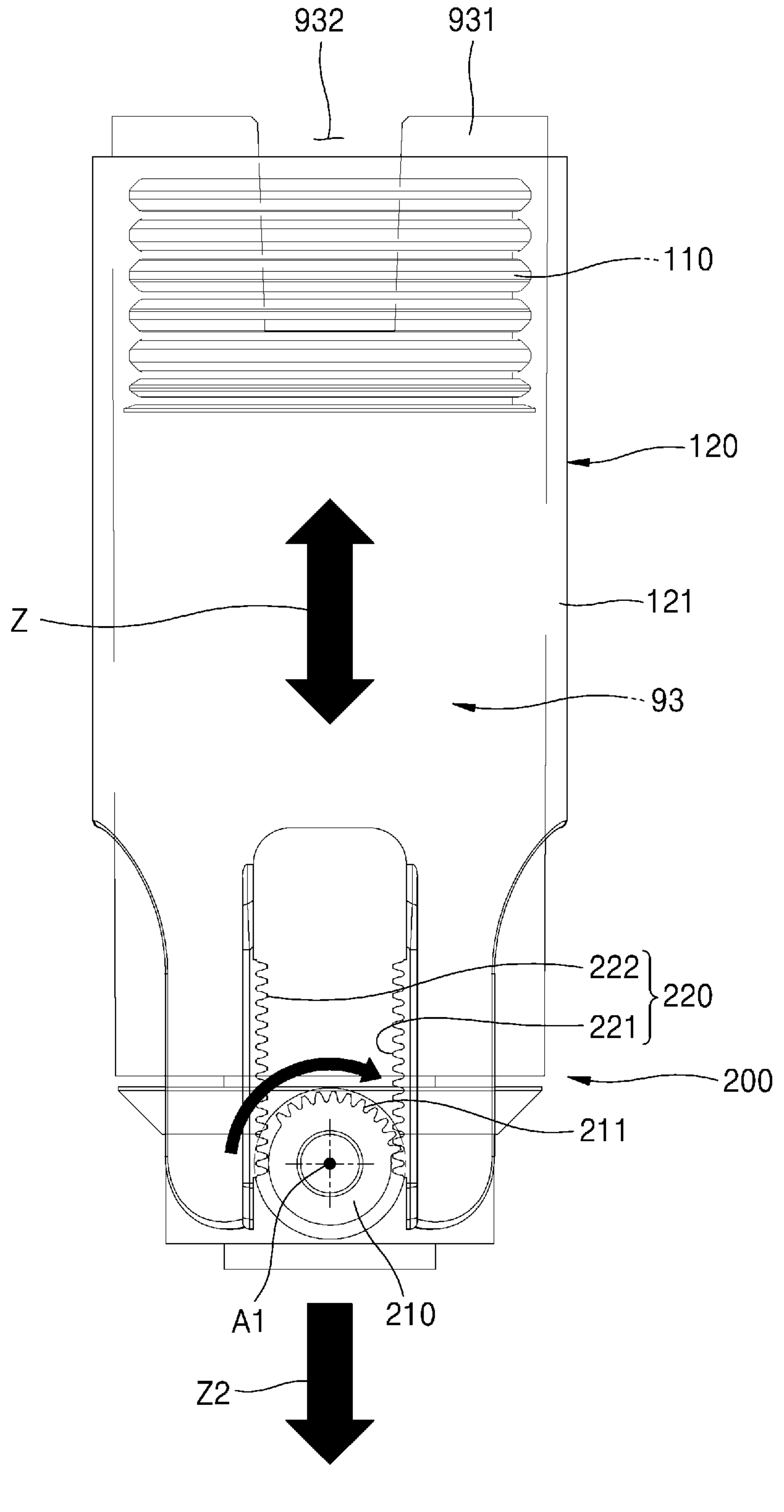
FIG. 11 is a view for explaining an example of a driving force transmission portion according to an example.

For example, referring further to FIG. 11, the driving force transmission portion 200 may include a rack and pinion gear structure that converts a rotational motion into a linear motion. The driving force transmission portion 200 includes a pinion gear 210 that receives a rotational force from the driving force input portion 95 and rotates about a rotational axis A1 perpendicular to the toner discharge direction Z2. The driving force transmission portion 200 further includes a rack gear 220 engaged with the pinion gear 210 and linearly reciprocating in the vertical direction Z. The rack gear 220 is arranged on the pressing member 120. The rack gear 220 is linearly moved by the pinion gear 210, and accordingly, the pressing member 120 on which the rack gear 220 is arranged linearly moves together with the rack gear 220.

The rack gear 220 includes first and second rack gear portions 221 and 222 arranged on both sides of the pinion gear 210. The pinion gear 210 includes a partial gear portion 211 selectively engaged with the first and second rack gear portions 221 and 222.

Figure 12:
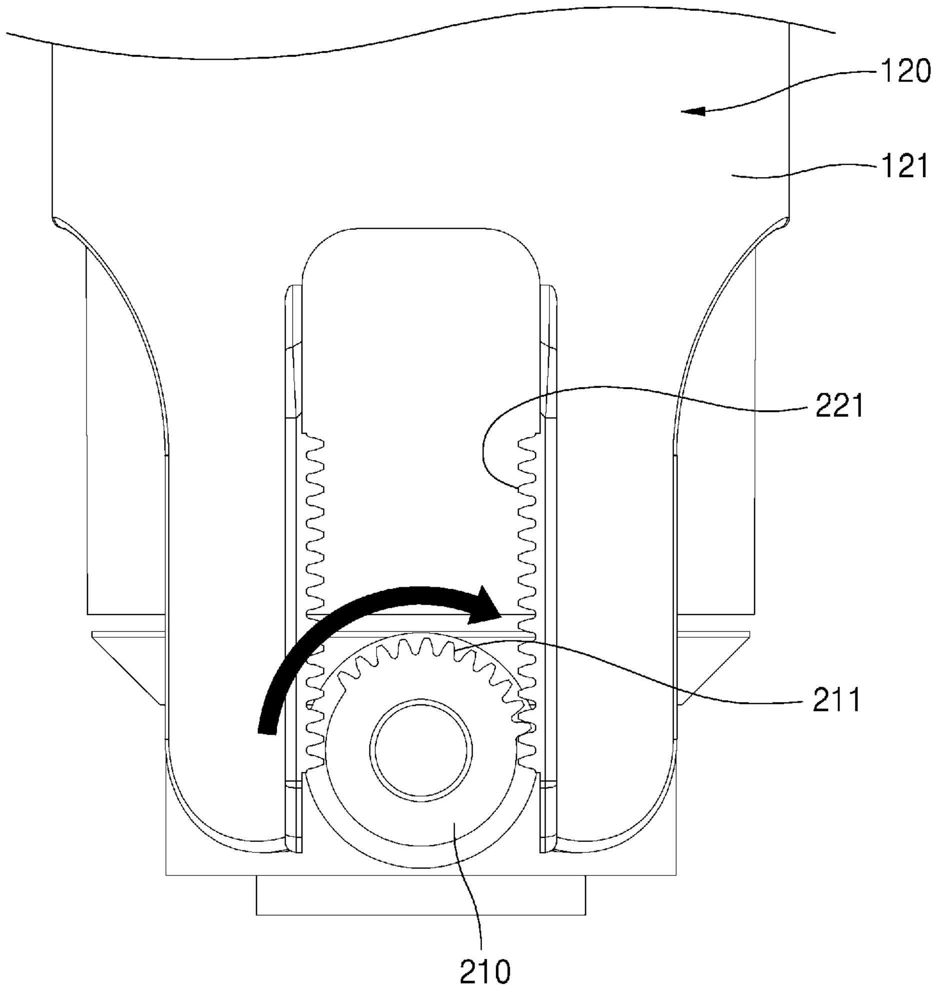
FIG. 12 is a view for explaining the movement of a pressing member by a rack and pinion structure.
Figure 13:
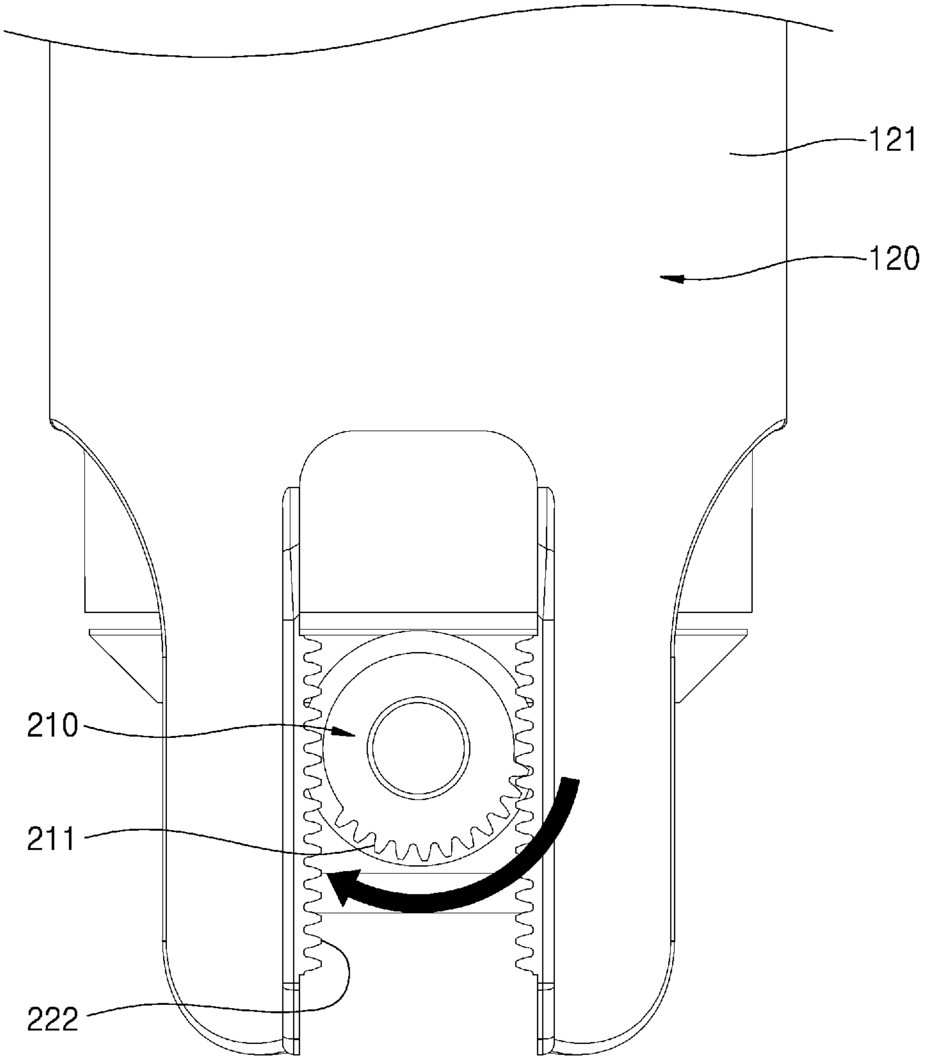
FIG. 13 is a view for explaining the movement of a pressing member by a rack and pinion structure.

FIG. 12 and FIG. 13 are views for explaining the movement of the pressing member 120 by a rack and pinion structure. Referring to FIG. 12, the pinion gear 210 may rotate in one direction, for example, in a clockwise direction. While the pinion gear 210 rotates, the partial gear portion 211 is engaged with the first rack gear portion 221, and the first rack gear portion 221 and the pressing member 120 descend. Referring to FIG. 13, while the pinion gear 210 rotates, the partial gear portion 211 is engaged with the second rack gear portion 222, and the second rack gear portion 222 and the pressing member 120 ascend.

As such, while the pinion gear 210 rotates, the partial gear portion 211 is alternately engaged with the first rack gear portion 221 and the second rack gear portion 222, and accordingly, the pressing member 120 alternately descends and ascends.

When the pressing member 120 descends, as shown in FIG. 7, the variable volume member 110 is retracted, the internal pressure of the toner storage portion 93 increases, and the toner is discharged through the toner discharge portion 94. When the pressing member 120 ascends, as shown in FIG. 8, the variable volume member 110 is expanded, and the internal pressure of the toner storage portion 93 decreases, so that air may be sucked in from outside. By a reciprocating linear movement of the pressing member 120, the discharge of toner and the suction of air are repeatedly performed, and the toner may be stably discharged through the toner discharge portion 94.

Figure 14:
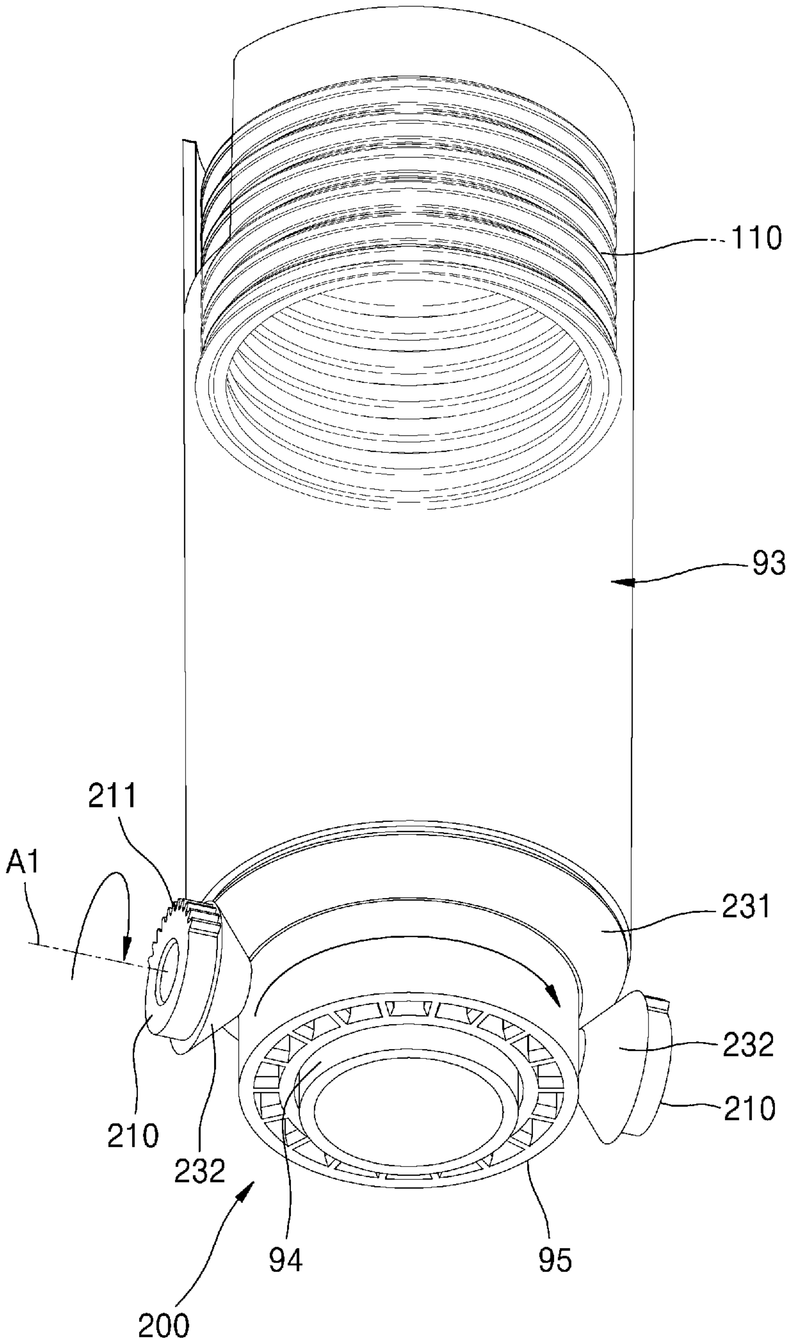
FIG. 14 is a view for explaining a connection relationship between a pinion gear and a driving force input portion.

FIG. 14 is a view for explaining a connection relationship between the pinion gear 210 and the driving force input portion 95. In FIG. 14, the pressing member 120 is omitted for convenience. Referring to FIG. 14, the driving force transmission portion 200 may further include bevel gears 231 and 232 arranged between the pinion gear 210 and the driving force input portion 95 that are described above. The bevel gears 231 and 232 may change the direction of a rotating shaft. For example, the bevel gears 231 and 232 include the first bevel gear 231 that is rotated by the driving force input portion 95 and the second bevel gear 232 that is rotated about a rotation axis different from that of the first bevel gear 231. The first bevel gear 231 is arranged coaxially with the driving force input portion 95 and may rotate together with the driving force input portion 95. The second bevel gear 232 may be arranged coaxially with the rotating shaft A1 of the pinion gear 210. The pinion gear 210 may rotate together with the second bevel gear 232. The rotation axis of the second bevel gear 232 may be perpendicular to the toner discharge direction (Z2 in FIG. 7).

A rotational force of the driving force input portion 95 is transmitted to the pinion gear 210 by the bevel gears 231 and 232. For example, the driving force input portion 95 surrounding the toner discharge portion 94 rotates in one direction, for example, clockwise. As the driving force input portion 95 rotates in the clockwise direction, the coaxial first bevel gear 231 rotates clockwise, and the second bevel gear 232 engaged with the first bevel gear 231 rotates clockwise. When the second bevel gear 232 rotates clockwise, the pinion gear 210 arranged on the second bevel gear 232 rotates.

Figure 15:
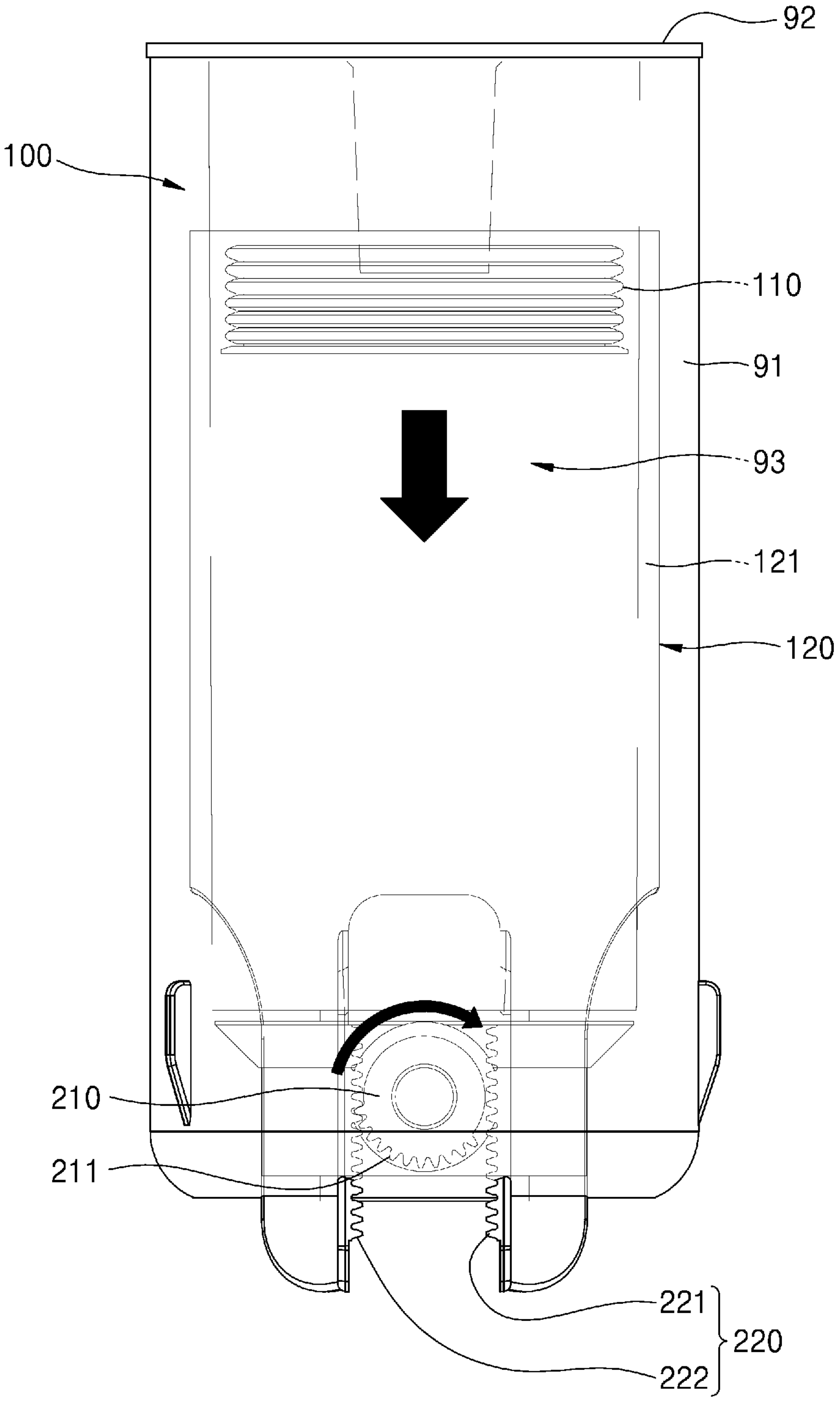
FIG. 15 is a view for explaining an operation of a toner refill cartridge according to an example.
Figure 16:
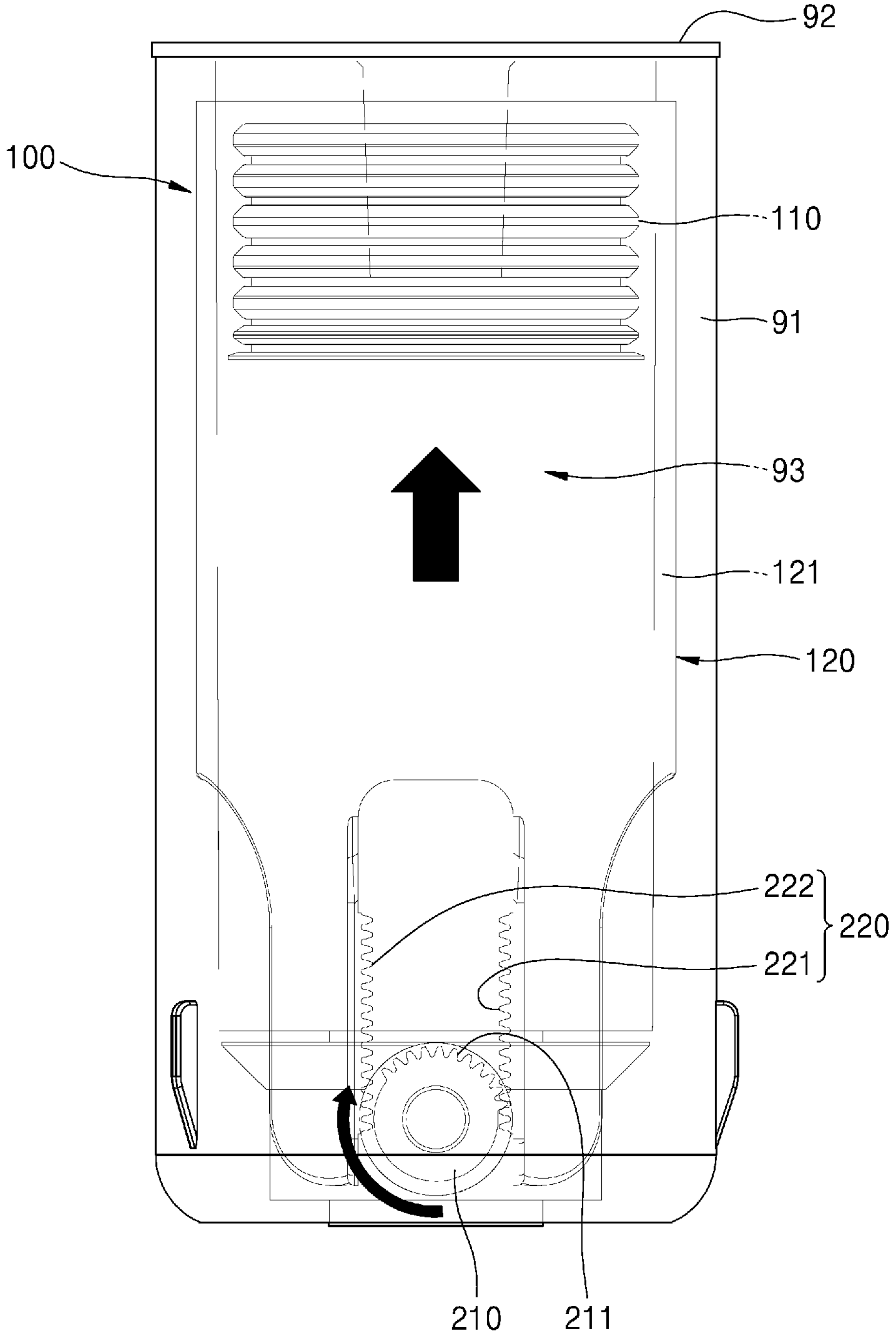
FIG. 16 is a view for explaining an operation of a toner refill cartridge according to an example.

FIGS. 15 and 16 are views for explaining an operation of the toner refill cartridge 9 according to an example. Referring to FIGS. 7 and 15, as the pinion gear 210 rotates clockwise, the partial gear portion 211 is rotated while engaging with the first rack gear portion 221, and the first rack gear portion 221 and the pressing member 120 provided with the first rack gear portion 221 descend. Thereafter, the pressing plate 122 presses an upper portion of the variable volume member 110 to retract the variable volume member 110. Accordingly, the internal pressure of the toner storage portion 93 increases to a high pressure state, and the toner is discharged in the toner discharge direction.

Referring to FIGS. 8 and 16, thereafter, as the pinion gear 210 continues to rotate in the same direction, the partial gear portion 211 of the pinion gear 210 rotates along with the second rack gear portion 222, and moves up the pressing member 120 in which the second rack gear portion and the second rack gear portion 222 are installed. Accordingly, the variable volume member 110 may be expanded to its original state by releasing the pressure by the pressing member 120.

In this way, by the partial gear portion 211 and the first and second rack gear portions 221 and 222 of the pinion gear 210, the variable volume member 110 may be retracted and expanded by reciprocating the pressing member 120 without changing the rotation direction of the pinion gear 210. The pump 100 provides pressure, through a volume change of the variable volume member 110, for discharging the toner.

During one cycle of the pump 100, a length at which the variable volume member 110 is retracted by being pressed by the pressing member 120 is constant, and thus, the pressure provided by the pump 100 is constant. Because the pressure is constant, the amount of toner discharged through the toner discharge portion 94 during one cycle of the pump 100 may also be constant. Accordingly, whether or not the toner discharge of the toner refill cartridge 9 is completed may be easily predicted by a driving force transmitted by the driving force input portion 95.

Figure 17:
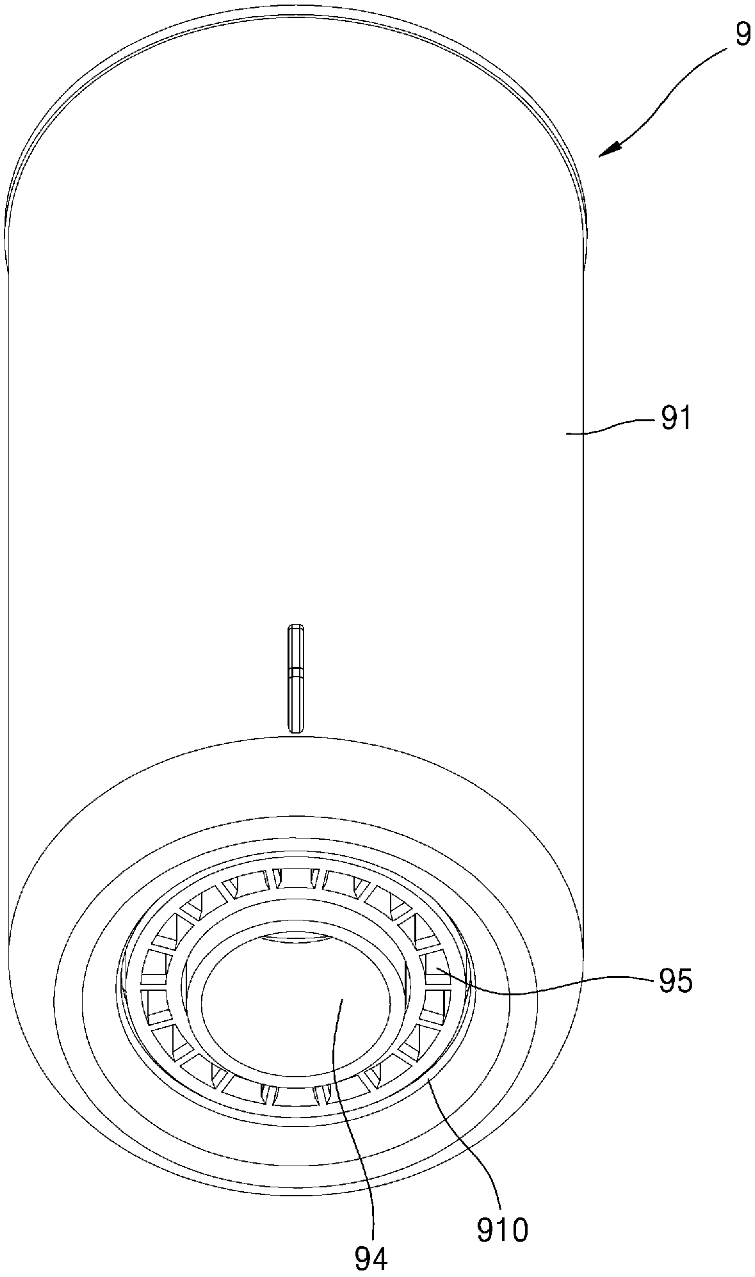
FIG. 17 is a lower perspective view of a toner refill cartridge according to an example.
Figure 18:
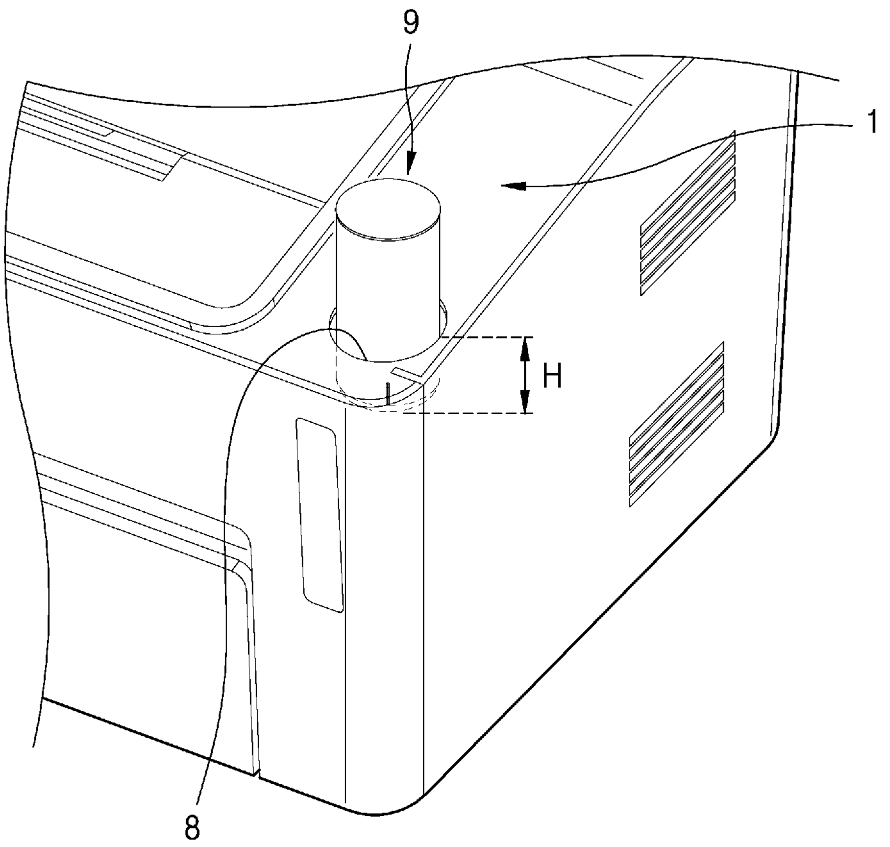
FIG. 18 is a view illustrating a state in which a toner refill cartridge according to an example is inserted into a communicating portion.

FIG. 17 is a perspective view of the toner refill cartridge 9 according to an example as viewed from below. FIG. 18 is a view illustrating a state in which the toner refill cartridge 9 according to an example is inserted into the communicating portion 8.

Referring to FIG. 17, in the toner refill cartridge 9, the toner discharge portion 94 and the driving force input portion 95 are arranged at the other end of the housing 91, and the variable volume member 110 is arranged distally from the toner discharge portion 94. Because the toner discharge portion 94 and the driving force input portion 95 are arranged adjacent to each other, the toner discharge portion 94 and the driving force input portion 95 may be exposed through the opening 910 of the housing 91.

By arranging the toner discharge portion 94 and the driving force input portion 95 adjacent to a lower portion of the toner refill cartridge 9, the configuration of the communicating portion 8 to which the toner refill cartridge 9 is connected may be simplified. For example, in the communicating portion 8, a toner inlet (not shown) for receiving toner through the toner discharge portion 94 may be flush with a driving coupler (not shown) for transmitting driving force to the driving force input portion 95. Accordingly, as shown in FIG. 18, a portion of the toner refill cartridge 9 is inserted into the communicating portion 8, and the toner refill cartridge 9 may be connected to the developing cartridge 2. For example, an insertion height H of the toner refill cartridge 9 inserted into the communicating portion 8 may be 20% or less of the total length of the toner refill cartridge 9. The insertion height H of the toner refill cartridge 9 inserted into the communicating portion 8 may be 20 millimeters (mm) or less.

However, the configurations of the driving force input portion 95 and the force transmission portion 200 according to the above are examples and are not limited thereto. The driving force input portion 95 may be variously modified within a range arranged adjacent to the toner storage portion 93 in the toner refill cartridge 9, and the driving force transmission portion 200 may also be modified in various ways as long as the driving force transmission portion 200 has a structure for transmitting driving force to the pressing member 120 that presses the variable volume member 110 arranged at the other end of the toner storage portion 93.

Figure 19A:
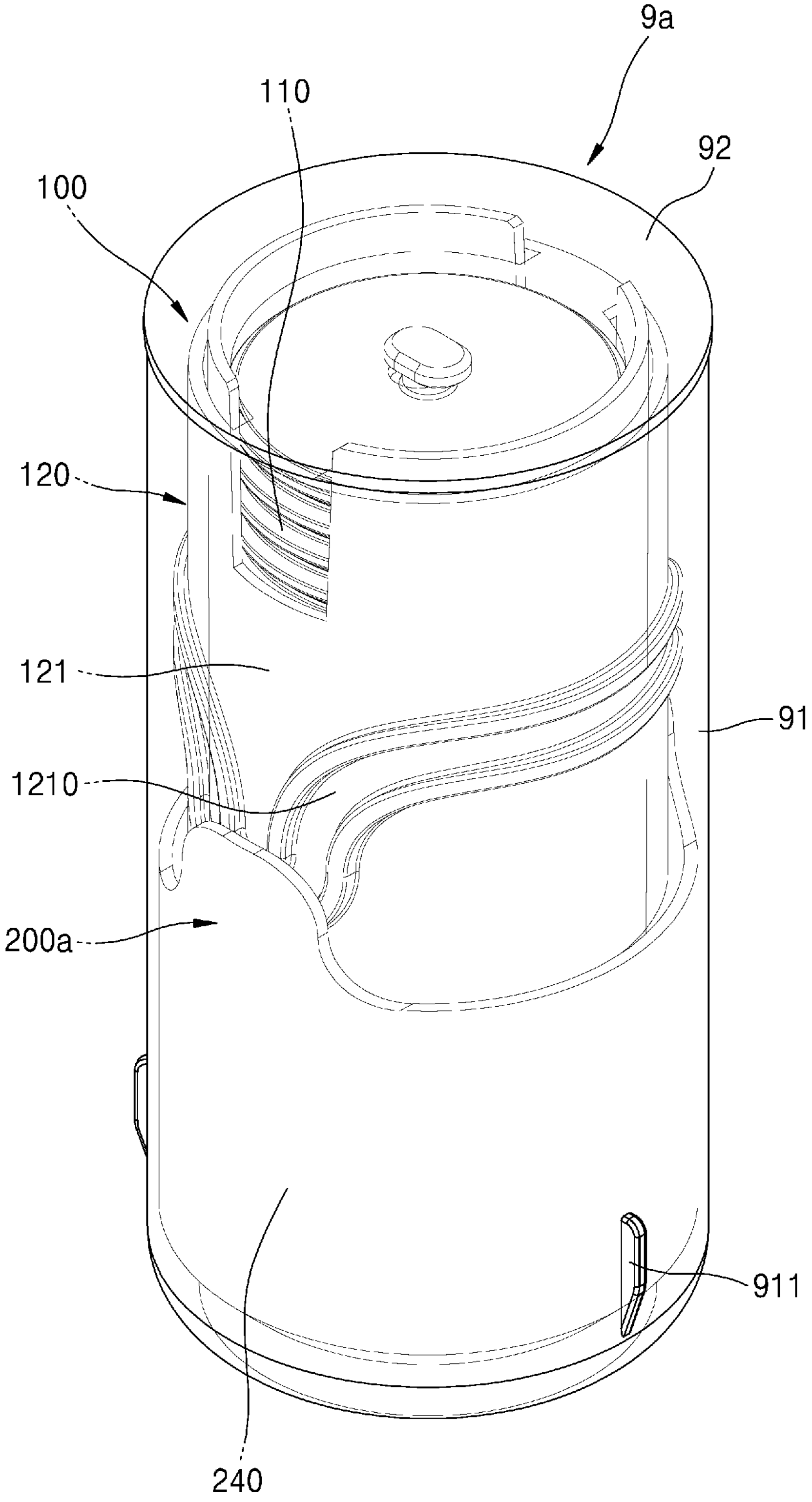
FIGS. 19A and 19B are perspective views of a toner refill cartridge according to another example viewed from different angles.
Figure 19B:
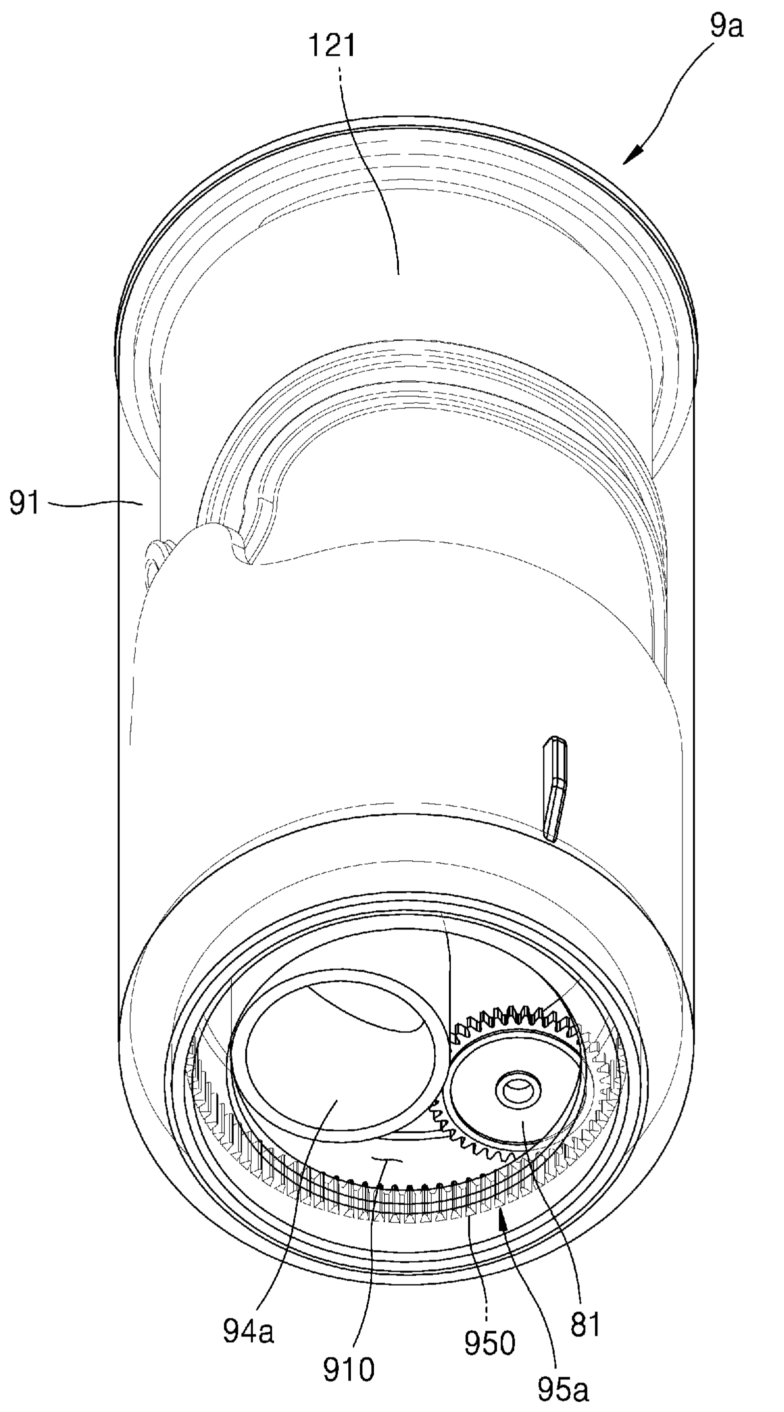
Figure 20:
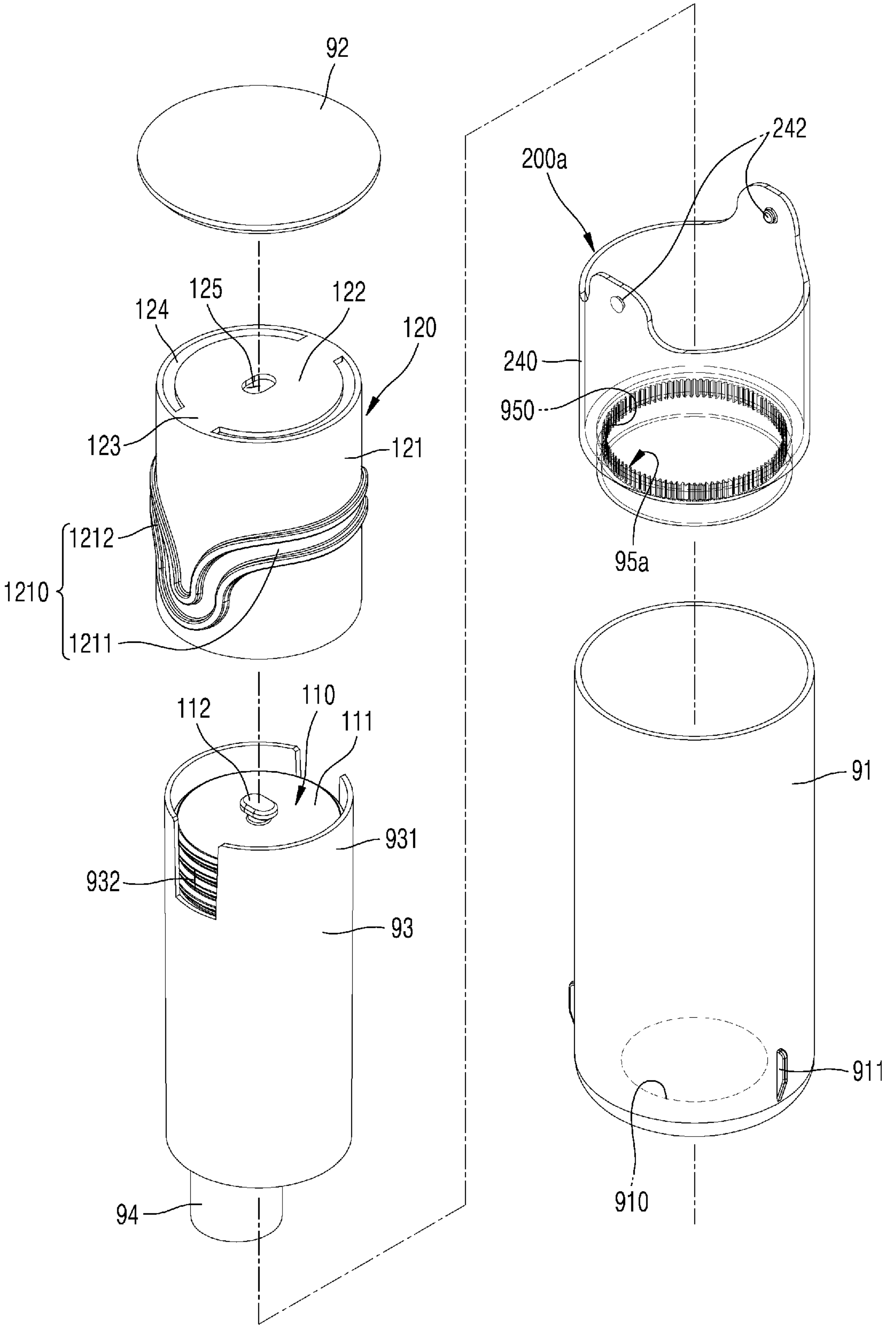
FIG. 20 is an exploded perspective view of the toner refill cartridge of FIG. 19A.

FIGS. 19A and 19B are perspective views of a toner refill cartridge 9*a* according to another example viewed from different angles. In FIGS. 19A and 19B, the housing 91 is indicated by dashed lines for convenience of description. FIG. 20 is an exploded perspective view of the toner refill cartridge 9*a* of FIG. 19A.

Referring to FIGS. 19A, 19B, and 20, the toner refill cartridge 9*a* includes the housing 91, the toner storage portion 93, the pump 100, the pressing member 120, a driving force input portion 95*a*, and a driving force transmission portion 200*a*. A duplicate description of the same configuration as in the above-described example will be omitted, and differences will be mainly described later below.

The pressing member 120 includes the pressing frame 121, the pressing plate 122, and the cutout 124. The pressing plate 122 may be fixed to an upper portion of the variable volume member 110. For example, the pressing plate 122 may be fixed to the upper portion of the variable volume member 110 by coupling a fixing groove 125 and a fixing protrusion 112. Accordingly, when the pressing member 120 ascends, the variable volume member 110 fixed to the pressing plate 122 may be expanded.

The driving force transmission portion 200*a* may have a cam structure configured such that the pressing frame 121 of the pressing member 120 reciprocates in a direction parallel to the toner discharge direction. The cam structure includes a guide groove 1210 extending in a direction inclined to the toner discharge direction, and a guide protrusion 242 inserted into the guide groove 1210.

For example, the driving force transmission portion 200*a* includes a rotating frame 240 that surrounds the pressing frame 121 and rotates. The guide groove 1210 inclined at an angle to the toner discharge direction is arranged in any one of the rotating frame 240 and the pressing frame 121, and the guide protrusion 242 inserted into the guide groove 1210 is arranged on the other one of the rotating frame 240 and the pressing frame 121.

For example, as shown in FIG. 20, the guide groove 1210 is formed on an outer peripheral surface of the pressing frame 121. The guide groove 1210 includes a first guide area 1211 obliquely extending from the bottom to the top, and a second guide area 1212 obliquely extending from the top to the bottom. A plurality of guide protrusions 242 inserted into the guide groove 1210 are provided on an inner circumferential surface of the rotating frame 240.

The driving force input portion 95*a* is below the rotating frame 240. The driving force input portion 95*a* includes an internal gear 950 arranged on an inner circumferential surface of the rotating frame 240. The driving force input portion 95*a* is arranged to surround a toner discharge portion 94*a*.

When the internal gear 950 of the driving force input portion 95*a* rotates, the rotating frame 240 rotates. Because the guide protrusion 242 is inserted into the guide groove 1210, a rotational force of the rotating frame 240 is transmitted to the pressing frame 121 through the guide protrusion 242 and the guide groove 1210. Because the protrusion 931 of the toner storage portion 93 is inserted into the cutout 124 of the pressing frame 121, the rotation of the pressing frame 121 is limited. Accordingly, when the rotating frame 240 rotates, the pressing frame 121 is repeatedly raised and lowered by the guide protrusion 242 and the guide groove 1210.

Figure 21A:
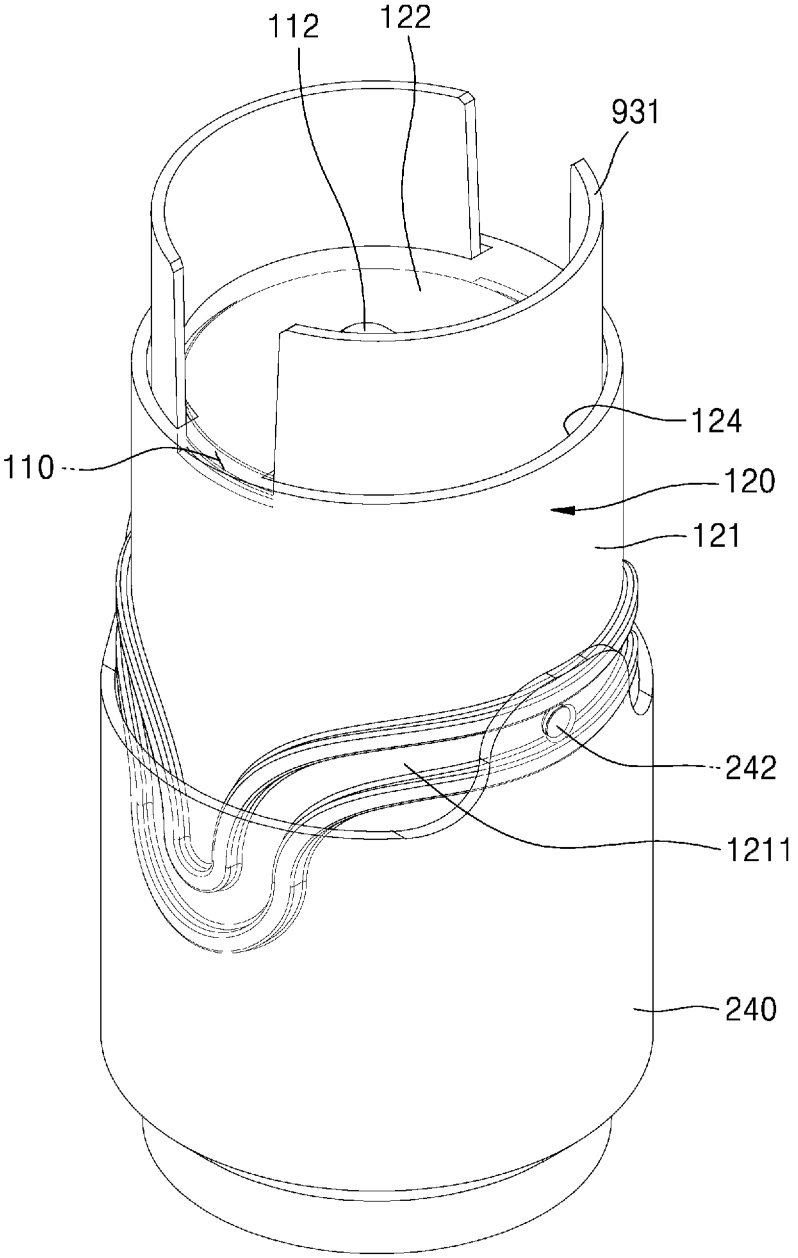
FIG. 21A is a perspective view illustrating a state in which a variable volume member of the toner refill cartridge of FIG. 19A is retracted.
Figure 21B:
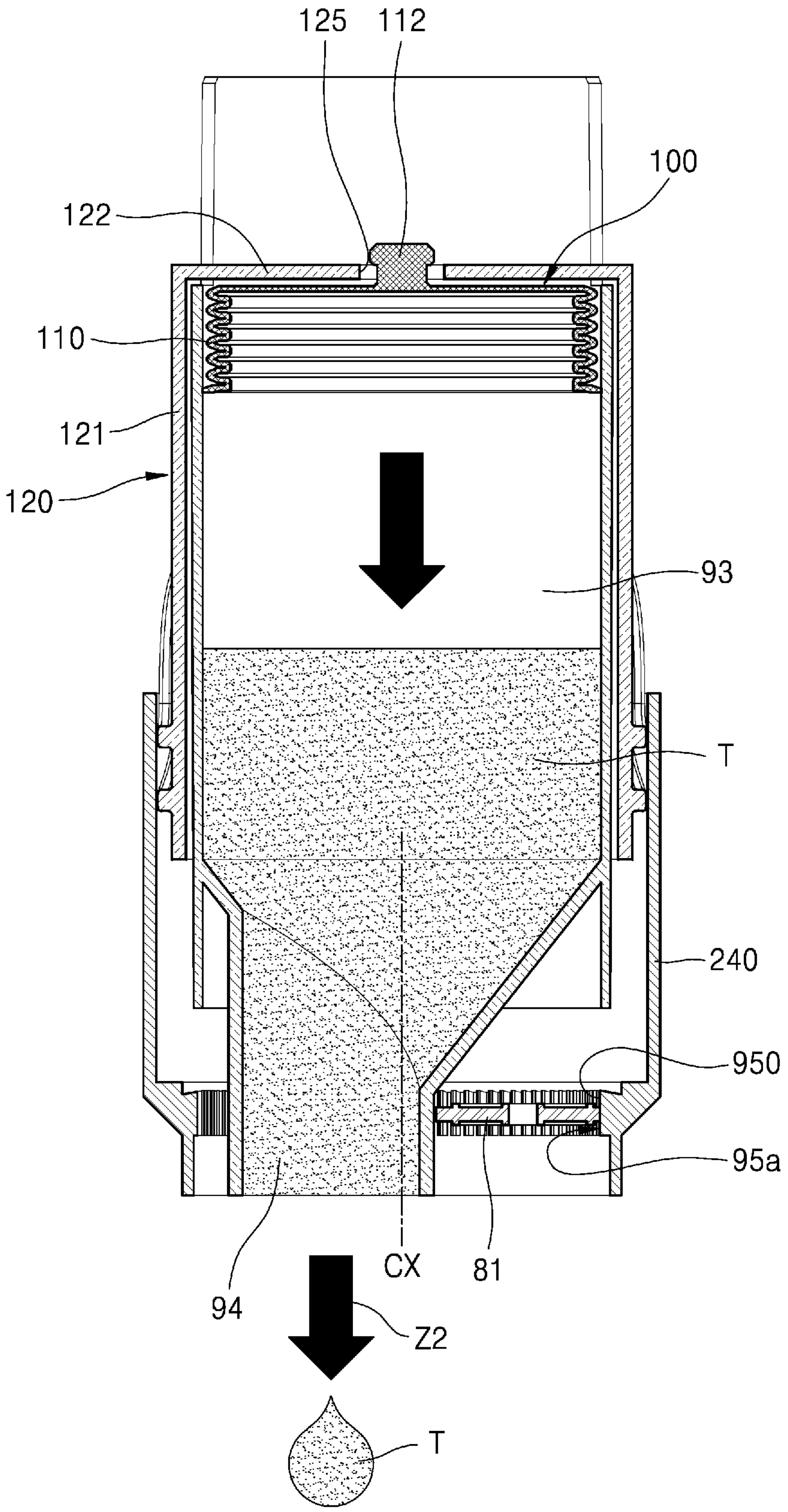
FIG. 21B is a cross-sectional view illustrating a state in which a variable volume member of the toner refill cartridge of FIG. 19A is retracted.
Figure 22A:
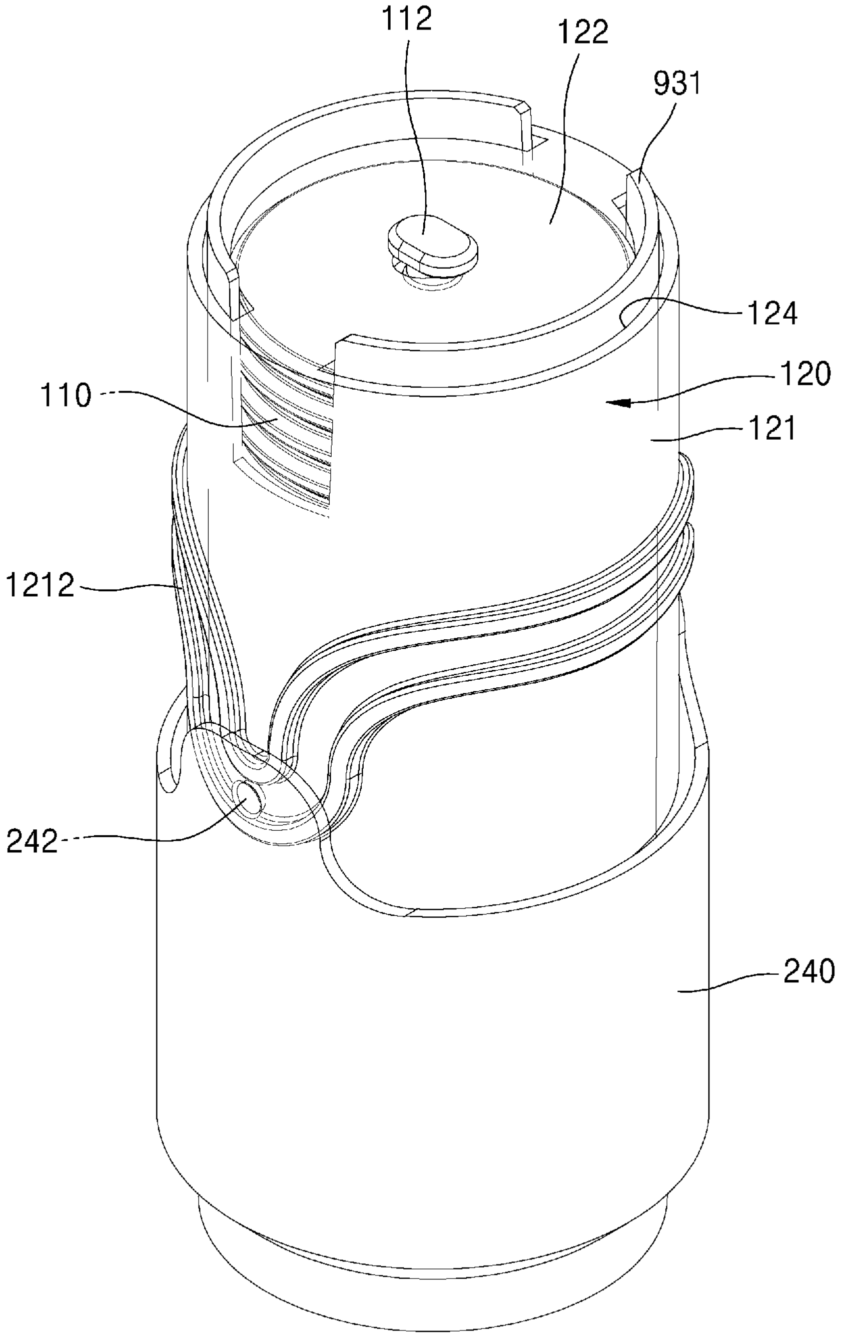
FIG. 22A is a perspective view illustrating a state in which the variable volume member of the toner refill cartridge of FIG. 19A is expanded.
Figure 22B:
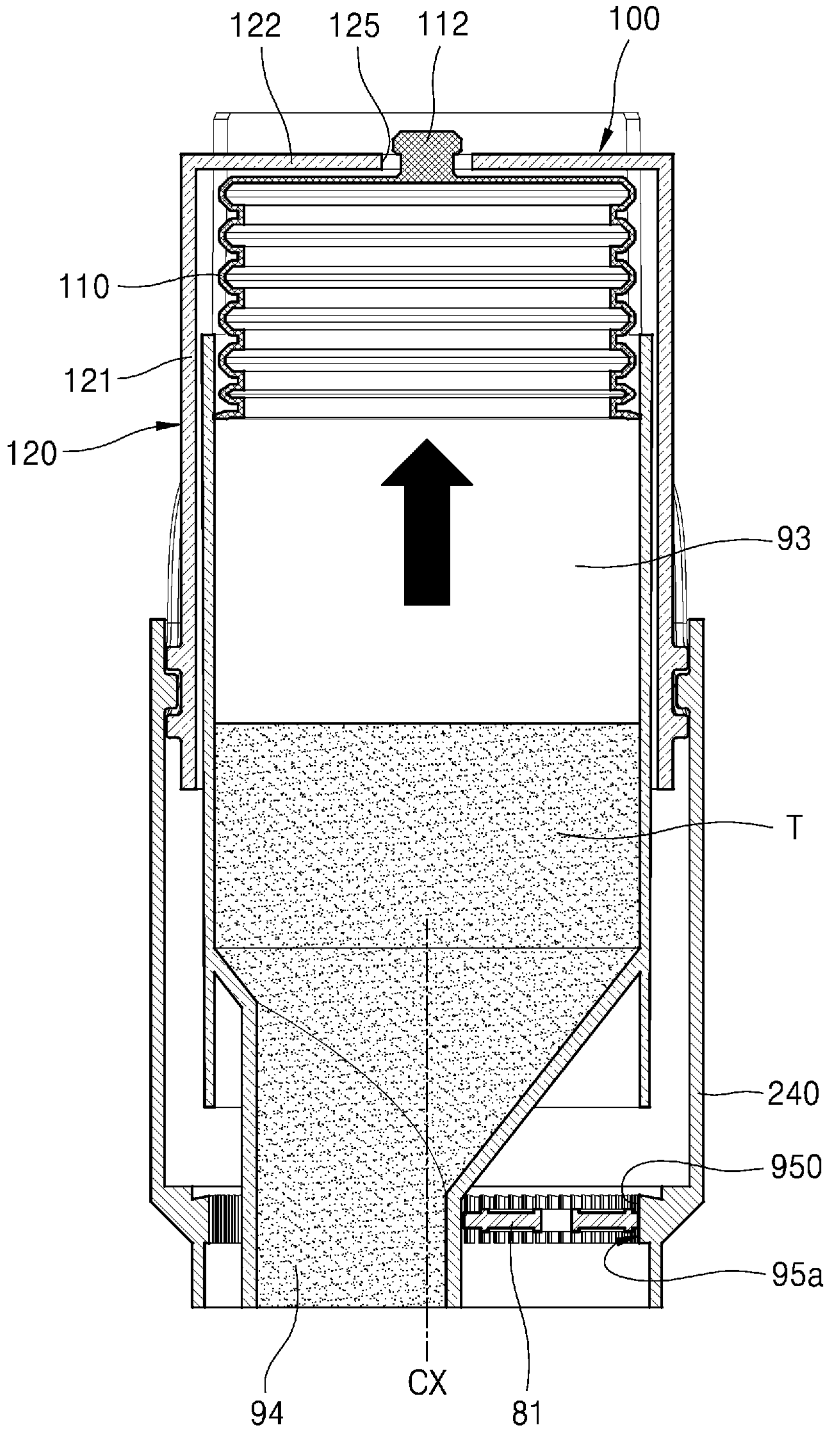
FIG. 22B is a cross-sectional view illustrating a state in which a variable volume member of the toner refill cartridge of FIG. 19A is expanded.

FIGS. 21A and 21B are a perspective view and a cross-sectional view, respectively, illustrating a state in which the variable volume member 110 of the toner refill cartridge 9*a* of FIG. 19A is retracted. FIGS. 22A and 22B are a perspective view and a cross-sectional view, respectively, illustrating a state in which the variable volume member 110 of the toner refill cartridge 9*a* of FIG. 19A is expanded.

Referring to FIGS. 21A and 21B, when the rotating frame 240 is rotated by the driving force input portion 95*a*, the guide protrusion 242 moves from a lower portion to an upper portion of the pressing frame 121 along the first guide area 1211. Because rotation of the pressing frame 121 is restricted by the protrusion 931 of the toner storage portion 93, the pressing frame 121 descends due to a driving force transmitted by the guide protrusion 242. Therefore, the pressing plate 122 presses the variable volume member 110 to retract the variable volume member 110. Accordingly, the toner is discharged through the toner discharge portion 94*a*.

Referring to FIGS. 22A and 22B, when the rotating frame 240 is rotated by the driving force input portion 95*a*, the guide protrusion 242 moves from the upper portion to a lower portion of the pressing frame 121 along the second guide area 1212. Because rotation of the pressing frame 121 is restricted by the protrusion 931 of the toner storage portion 93, the pressing frame 121 ascends due to a driving force transmitted by the guide protrusion 242. Therefore, the pressing plate 122 pulls the variable volume member 110 from the bottom up by the fixing protrusion 112, so that the variable volume member 110 expands. Accordingly, the pump 100 is restored to the state before pressurization.

The driving force input portion 95*a* may be rotated by a driving gear 81 arranged in the developing cartridge 2 (not shown). When the toner refill cartridge 9*a* is inserted into the communicating portion 8, the driving gear 81 may be arranged to deviate from a rotation center axis CX of the driving force input portion 95*a*. The toner discharge portion 94 may be arranged to deviate from the rotation center axis CX of the driving force input portion 95*a* in order to prevent interference with the driving gear 81.

Meanwhile, in the above-described examples, a ring structure in which the driving force input portion s 95 and 95*a* surround the toner discharge portions 94 and 94*a* has been exemplified. However, the arrangement of the driving force input portions 95 and 95*a* is not limited thereto, and the positions and shapes thereof may be freely modified if the driving force input portion s 95 and 95*a* are arranged on at least one side of the toner discharge portions 94 and 94*a*.

Figure 23:
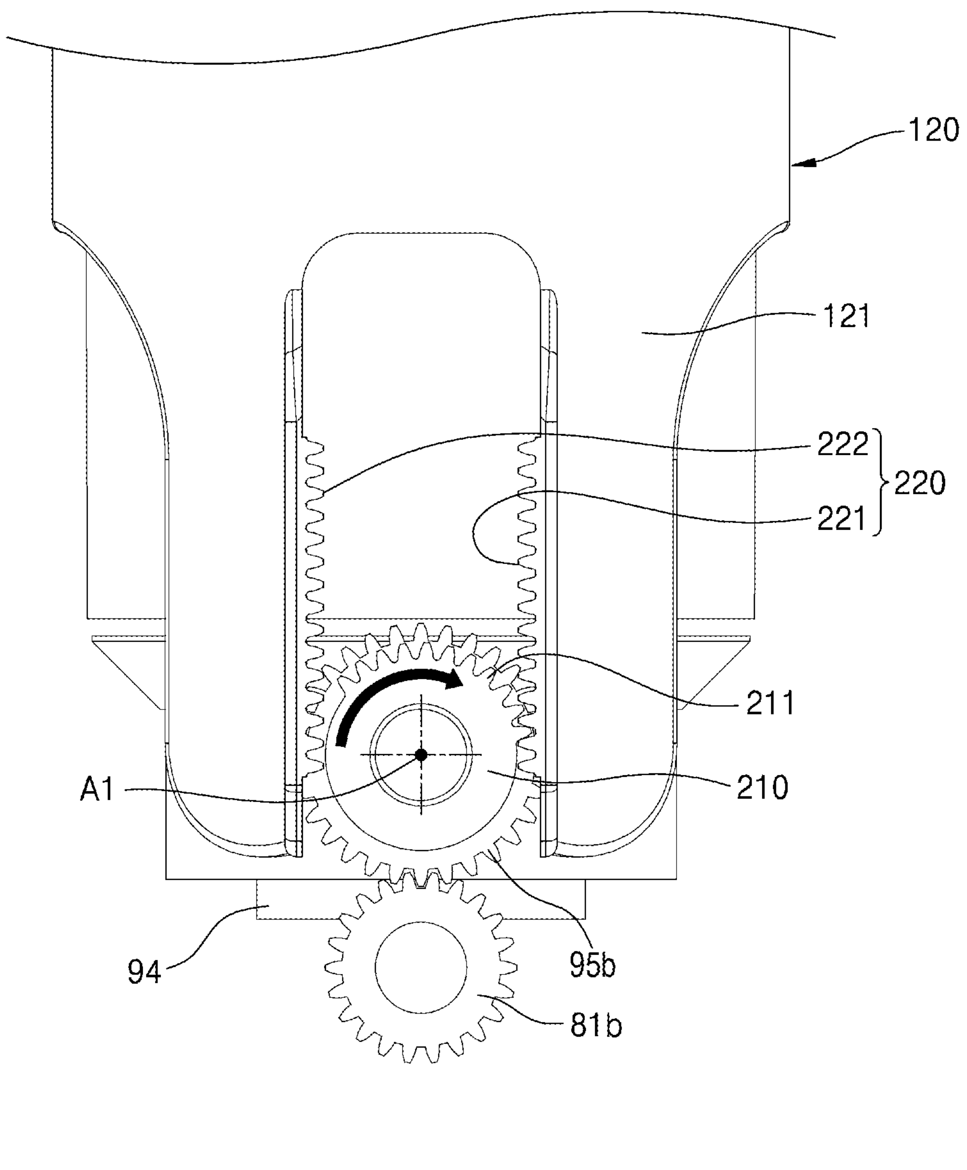
FIG. 23 is a view illustrating a portion of a toner refill cartridge including a driving force input portion according to another example.

FIG. 23 is a view illustrating a portion of the toner refill cartridge 9 including a driving force input portion 95*b* according to another example. Referring to FIG. 23, the driving force input portion 95*b* according to an example may be arranged on one side of the toner discharge portion 94 and may be arranged coaxially with the pinion gear 210 rotating about the rotation axis A1 perpendicular to a toner discharge direction. The driving force input portion 95*b* may be rotated by a driving gear 81*b* arranged in the developing cartridge 2 (see FIG. 2). The pinion gear 210 rotates by the rotation of the driving force input portion 95*b*, and the rack gear 220 engaged with the pinion gear 210 may ascend or descend.

It should be understood that examples described herein should be considered in a descriptive sense only and not for purposes of limitation. Descriptions of features or aspects within each example should typically be considered as available for other similar features or aspects in other examples. While one or more examples have been described with reference to the figures, it will be understood by those of ordinary skill in the art that various changes in form and details may be made therein without departing from the spirit and scope as defined by the following claims.

What is claimed is:

1. A toner refill cartridge comprising:
a housing having an opening;
a toner storage portion inside the housing and to store a toner;
a toner discharge portion at an end of the toner storage portion and to discharge the toner;
a pump comprising a variable volume member capable of retracting and expanding, the pump to provide pressure, through a volume change of the variable volume member, for discharging the toner;
a driving force input portion rotatable by a driving force received from outside the toner refill cartridge; and
a driving force transmission portion to receive a rotational force of the driving force input portion, convert the rotational force into a force for changing a volume of the variable volume member, and transmit the force to the pump,
wherein a retraction direction of the variable volume member is the same as a toner discharge direction of the toner discharge portion, and the variable volume member is arranged on an opposite side of the toner discharge portion from the toner discharge portion, and the toner storage portion is between the variable volume member and the toner discharge portion, and
the driving force input portion is arranged on at least one side of the toner discharge portion, and the driving force input portion and the toner discharge portion are exposed to the outside through the opening of the housing.

2. The toner refill cartridge of claim 1, wherein the driving force input portion comprises a ring structure surrounding the toner discharge portion, and a rotation center of the driving force input portion is arranged inside the toner discharge portion.

3. The toner refill cartridge of claim 1, wherein an inner diameter of the driving force input portion is greater than an outer diameter of the toner discharge portion.

4. The toner refill cartridge of claim 1, wherein the variable volume member comprises a bellows structure that is folded in the toner discharge direction or unfolded in a direction opposite to the toner discharge direction.

5. The toner refill cartridge of claim 1, wherein the pump further comprises a pressing member to press an upper surface of the variable volume member, and the pressing member is to reciprocate in a direction parallel to the toner discharge direction.

6. The toner refill cartridge of claim 5, wherein the driving force transmission portion is to convert a rotational motion of the driving force input portion into a reciprocating linear motion of the pressing member.

7. The toner refill cartridge of claim 6, wherein the driving force transmission portion comprises:
a pinion gear to receive the rotational force of the driving force input portion and rotate about a rotational axis perpendicular to the toner discharge direction; and
a rack gear on the pressing member and to linearly reciprocate responsive to a rotation of the pinion gear.

8. The toner refill cartridge of claim 7, wherein the rack gear comprises first and second rack gear portions arranged on both sides of the pinion gear, and
the pinion gear comprises a partial gear portion selectively engaged with the first and second rack gear portions.

9. The toner refill cartridge of claim 8, wherein the partial gear portion is engaged with the first rack gear portion to move down the pressing member, and
the partial gear portion is engaged with the second rack gear portion to move up the pressing member.

10. The toner refill cartridge of claim 5, wherein the pressing member is fixed to the upper surface of the variable volume member to expand the variable volume member in response to the pressing member ascending.

11. The toner refill cartridge of claim 5, wherein the pressing member comprises:
a pressing plate to press the upper surface of the variable volume member; and
a pressing frame to support the pressing plate, the pressing frame arranged outside the toner storage portion and extends in a direction parallel to the toner discharge direction.

12. The toner refill cartridge of claim 11, wherein the driving force transmission portion comprises a cam structure to cause a reciprocation of the pressing frame in the direction parallel to the toner discharge direction.

13. The toner refill cartridge of claim 12, wherein the pressing frame has a cylindrical structure surrounding the toner storage portion, and
the driving force transmission portion comprises:
a rotating frame that surrounds the pressing frame and is rotatable with respect to the pressing frame, wherein
a guide groove inclined at an angle to the toner discharge direction is arranged in one of the pressing frame and the rotating frame,
a guide protrusion inserted into the guide groove is arranged on the other of the pressing frame and the rotating frame, and
a rotational motion of the rotating frame is converted by the guide groove and the guide protrusion into a reciprocating linear motion of the pressing frame.

14. The toner refill cartridge of claim 13, wherein the driving force input portion comprises an internal gear formed on an inner peripheral surface of the rotating frame.

15. The toner refill cartridge of claim 14, wherein the toner discharge portion is arranged to deviate from a rotation center axis of the driving force input portion.

* * * * *